US010256918B2

(12) United States Patent
Harris et al.

(10) Patent No.: US 10,256,918 B2
(45) Date of Patent: Apr. 9, 2019

(54) SYSTEM AND METHOD FOR IMPLEMENTING ADAPTIVE PULSE POSITION MODULATION (APPM) FOR IMPROVED OPTICAL COMMUNICATIONS PERFORMANCE

(71) Applicant: Leidos, Inc., Reston, VA (US)

(72) Inventors: Susan Harris, Mukilteo, WA (US); Mark Krepel, Mukilteo, WA (US); James Lundberg, Snohomish, WA (US); Chris Fisher, Kirkland, WA (US)

(73) Assignee: Leidos, Inc., Reston, VA (US)

( * ) Notice: Subject to any disclaimer, the term of this patent is extended or adjusted under 35 U.S.C. 154(b) by 0 days.

(21) Appl. No.: 15/450,719

(22) Filed: Mar. 6, 2017

(65) Prior Publication Data

US 2017/0257173 A1    Sep. 7, 2017

Related U.S. Application Data

(60) Provisional application No. 62/303,854, filed on Mar. 4, 2016.

(51) Int. Cl.
*H04B 13/02* (2006.01)
*H04B 10/80* (2013.01)
(Continued)

(52) U.S. Cl.
CPC ....... *H04B 10/80* (2013.01); *H04B 10/07953* (2013.01); *H04B 10/112* (2013.01);
(Continued)

(58) Field of Classification Search
CPC ..... H04L 1/20; H04L 12/4013; H04L 1/0009; H04L 1/0072; H04W 28/02; H04W 28/22;
(Continued)

(56) References Cited

U.S. PATENT DOCUMENTS 4,995,101 A    2/1991  Titterton et al. ............. 455/607
7,203,425 B1   4/2007  Keller et al. ................. 398/123
(Continued)

FOREIGN PATENT DOCUMENTS

WO    WO 2016/164146    10/2016    ............. H04J 14/00

OTHER PUBLICATIONS

V. A. Vilnrotter, E. R. Rodemich, and H. H. Tan, "A Synchronization Technique for Optical PPM Signals," The Telecommunications and Data Acquisition Progress Report 42-87, Jul.-Sep. 1986, Jet Propulsion Laboratory, Pasadena, California, pp. 24-31, Nov. 15, 1986, http://tmo.jpl.nasa.gov/tmo/progress_report/42-87/87C.PDF.
(Continued)

*Primary Examiner* — Don N Vo
(74) *Attorney, Agent, or Firm* — Dawn-Marie Bey; Bey & Cotropia PLLC

(57) ABSTRACT

The Adaptable Pulse Position Modulation (APPM) optical communication system and process facilitate wireless communications through turbid mediums including, but not limited to, smoke, airborne dust, mist, fog, clouds, water, seawater and water-to-air (air-to-water) interfaces by controlling the signal gain at the optical detector and controlling of the signal encoding to allow high data rate operation when the signal to noise ratio is high. The system also supports signal encoding redundancy to maintain good connectivity at the cost of the communication channel data rate as the signal to noise degrades.

31 Claims, 33 Drawing Sheets

(51) Int. Cl.
  H04B 10/079 (2013.01)
  H04B 10/40 (2013.01)
  H04B 10/524 (2013.01)
  H04B 10/564 (2013.01)
  H04B 10/112 (2013.01)

(52) U.S. Cl.
  CPC ........... H04B 10/40 (2013.01); H04B 10/524 (2013.01); H04B 10/564 (2013.01); H04B 13/02 (2013.01)

(58) Field of Classification Search
  CPC ...... H04B 10/80; H04B 13/02; H04B 10/112; H04B 10/07953; H04B 10/524; H04B 10/40; H04B 10/564
  USPC .......................................................... 398/27
  See application file for complete search history.

(56) References Cited

U.S. PATENT DOCUMENTS

| | | | |
|---|---|---|---|
| 7,653,108 B2 | 1/2010 | Morris et al. | 372/50.12 |
| 8,081,882 B2 | 12/2011 | Tuchler | 398/189 |
| 9,490,910 B2 | 11/2016 | Lacovara | H04B 10/80 |
| 2002/0131121 A1* | 9/2002 | Jeganathan | H04B 10/1127 398/128 |
| 2012/0057508 A1* | 3/2012 | Moshfeghi | H04B 1/28 370/277 |
| 2013/0246077 A1* | 9/2013 | Riedmiller | G10L 19/008 704/500 |
| 2014/0212142 A1* | 7/2014 | Doniec | H04B 13/02 398/104 |
| 2014/0241309 A1* | 8/2014 | Hilton | H04B 3/54 370/330 |
| 2015/0171961 A1* | 6/2015 | Featherston | H04B 10/07955 398/38 |
| 2016/0050030 A1* | 2/2016 | Riedl | H04B 11/00 367/133 |
| 2016/0121009 A1* | 5/2016 | Farr | H04B 13/02 250/492.1 |
| 2016/0236760 A1* | 8/2016 | Siesjo | B63C 11/52 |

OTHER PUBLICATIONS

Srinivasan, M., Vilnrotter, V., and Lee, C., "Decision-Directed Slot Synchronization for Pulse-Position-Modulated Optical Signals," The Interplanetary Network Progress Report 41-161, Jet Propulsion Laboratory, Pasadena, California, May 15, 2005, http://ipnpr.jpl.nasa.gov/progress_report/42-161/161R.pdf.

Hemani Kaushal and Georges Kaddoum, "Underwater Optical Wireless Communication," IEEE Access, vol. 4, pp. 1518-1547, 2016.

"Scientific and Technical Reports—Preparation, Presentation, and Preservation," ANSI/NISO Z39.18/2005 (R2010), ISSN: 1041-5653, Published by the National Information Standards Organization, Baltimore, MD, 93 pp., Copyright 2010.

International Search Report and Written Opinion for PCT Application No. PCT/US17/20932, dated Jul. 7, 2017, 12 pp.

H. Kaushal and G. Kaddoum, "Underwater Optical Wireless Communication," IEEE Access, vol. 4, pp. 1518-1547, 2016.

M. O'Rourke, et al., "Multi-Modal Communications in Underwater Sensor Networks Using Depth Adjustment," WUWNet '12, Los Angeles, CA, Nov. 5-6, 2012, 5 pp.

S. Han, et al., "Evaluation of Underwater Optical-Acoustic Hybrid Network," China Communications, pp. 49-59, May 2014.

N. Farr, et al., "An Integrated, Underwater Optical / Acoustic Communications System," IEEE Xplore, Conference Paper, DOI: 10.1109/OCEANSSYD.2010.5603510, Jun. 2010.

H. Kulhandjian, et al., "Towards Experimental Evaluation of Software-Defined Underwater Networked Systems," Department of Electrical Engineering, State University of New York at Buffalo, and Teledyne Benthos, 2012, 9 pp.

* cited by examiner

Figure 4

| Timeslot | | | | |
|---|---|---|---|---|
| Sample 4 | Sample 3 | Sample 2 | Sample 1 | Sample 0 |
| 8, 16, 32, or 64 oversamples | 8, 16, 32, or 64 oversamples | 8, 16, 32, or 64 oversamples | 8, 16, 32, or 64 oversamples | 8, 16, 32, or 64 oversamples |

Figure 5

| Guard 2 | Guard 1 | Data 8 | Data 7 | Data 6 | Data 5 | Data 4 | Data 3 | Data 2 | Data 1 |
|---|---|---|---|---|---|---|---|---|---|

PPM 3_2 Symbol ($2^3$ dataslots and 2 guard slots)

| Sample counts | 5201 | 5211 | 5063 | 5253 | 4 | 7 | 5234 | 5139 | 5099 | 5127 |
|---|---|---|---|---|---|---|---|---|---|---|
| Symbol Alignment | Data 4 | Data 3 | Data 2 | Data 1 | Guard 2 | Guard 1 | Data 8 | Data 7 | Data 6 | Data 5 |

Symbol k + 1 | Symbol k

| Gray Coding | 1000 | 1001 | 1011 | 1010 | 1110 | 1111 | 1101 | 1100 | 0100 | 0101 | 0111 | 0110 | 0010 | 0011 | 0001 | 0000 |
|---|---|---|---|---|---|---|---|---|---|---|---|---|---|---|---|---|
| Guard 2 | Guard 1 | Data 16 | Data 15 | Data 14 | Data 13 | Data 12 | Data 11 | Data 10 | Data 9 | Data 8 | Data 7 | Data 6 | Data 5 | Data 4 | Data 3 | Data 2 | Data 1 |

PPM 4_2 Symbol ($2^4$ dataslots and 2 guard slots)

Figure 10

| Sample counts | 0 | 0 | 0 | 0 | 0 | 3 | 0 | 0 | | |
|---|---|---|---|---|---|---|---|---|---|---|
| Gray Coding | 100 | 101 | 111 | 110 | 010 | 011 | 001 | 000 | Guard 1 | Guard 2 |
| | Data 8 | Data 7 | Data 6 | Data 5 | Data 4 | Data 3 | Data 2 | Data 1 | | |

PPM 3_2 Symbol ($2^3$ dataslots and 2 guard slots)

| | Zero Count | One Count |
|---|---|---|
| Bit0 | 2 | 3 |
| Bit1 | 0 | 5 |
| Bit1 | 5 | 0 |

Result

One - confidence 3/5

One - confidence 5/5

Zero - confidence 5/5

Figure 11

SYSTEM AND METHOD FOR IMPLEMENTING ADAPTIVE PULSE POSITION MODULATION (APPM) FOR IMPROVED OPTICAL COMMUNICATIONS PERFORMANCE

CROSS REFERENCE TO RELATED APPLICATIONS

The present application claims benefit of priority to U.S. Provisional Patent Application No. 62/303,854, entitled "Adaptive Pulse Position Modulation (APPM) For Underwater Optical Communications Performance," filed Mar. 4, 2016, the entirety of which is incorporated herein by reference.

BACKGROUND

Field of the Embodiments

The present embodiments generally relate to systems and methods for facilitating communication in any turbid medium such as smoke, airborne dust, mist, fog, clouds, water, seawater, and through air-water interfaces and more particularly relate to system and methods for facilitating such communication through improved processing of optical signals at the receivers.

Description of the Related Art

The ability to communicate underwater is of interest to many entities for myriad of applications including military applications, environmental applications (e.g., pollution, climate change, etc.), industrial applications (e.g., offshore oil drilling and pipeline applications) and the like. While acoustic communication systems have been employed in some cases, such systems are limited in bandwidth and data rate. Optical communication systems—particularly wireless optical communication systems—could offer substantial improvements in bandwidth, data rate and data quality assuming the system is able to account for the complex attributes of turbid mediums such as ocean or sea water (absorption, scattering, organic matter).

Eight years ago Applicant began work, in partnership with SPAWAR Systems Center, Pacific on the development of high speed underwater optical data transfer systems that would enable two disconnected platforms to exchange data at speeds in excess of one gigabit per second over a distance of 5-15 meters. The success of that program focused attention on the next performance frontiers: bandwidth and distance. How fast can we transmit information across a water medium? How far can we transmit information across a water medium? The team first concentrated on the bandwidth question. Within three years after the initial one gigabit per second effort, the Applicant had tripled the bandwidth and tested systems up to three gigabits per second. During this effort, however, the technology requirements emphasis shifted from simple data transfer applications to tactical and strategic communications. The realization that underwater assets are, for the most part, excluded from the network-centric command and control scenarios prompted a new emphasis on platform to platform high-bandwidth undersea communications. This effectively shifted the focus from bandwidth to range.

When the goal is to transmit as much information as possible, engineers turn to very efficient encoding schemes such as the non-return-to-zero (NRZ) protocol used in the success referred to above. When the goal is increased range, higher power sources are used and one encoding scheme compatible with those sources is pulse position modulation (PPM). In addition, PPM has another advantage that, after initial studies and simulations, turned out to be the dominant criteria for successful long range communications: flexibility. Applicant's experience with data transfer systems taught us that link reliability is the most important, and the most difficult, design characteristic. Whereas in some data transfer scenarios data transfer speed may be primary, for most communications scenarios the maintenance of the link, regardless of speed, is primary.

Thus there is a need in the art for a system and process which facilitates data transfer and communication speeds underwater and/or across the air-water interface (AWI) at ranges of at least 100 meters, and, most importantly, facilitates the ability to smoothly adapt and maintain a communications link at the highest bandwidth allowed by given conditions.

SUMMARY OF THE EMBODIMENTS

A first exemplary embodiment includes a communications system for facilitating communications across a wireless optical channel. The communications system includes: an optical transmission device for transmitting encoded optical signals across the wireless optical channel, wherein the optical transmission device includes means for encoding the optical signals in accordance with at least one of multiple encoding schemes; an optical detection device for receiving transmitted optical signals from the optical transmission device across the wireless optical channel, wherein the optical detection device includes means for automatically adjusting gain of the optical detection device responsive to one or more measurements related to the received optical signals; and further wherein the means for encoding the optical signals varies an applicable at least one of multiple encoding schemes during the communication with the optical detection device responsive to the one or more measurements related to the received optical signals.

A second exemplary embodiment includes a transceiver for facilitating wireless communications. The transceiver includes: an optical transmission device for transmitting optical signals, wherein the optical transmission device includes means for encoding data within the transmitted optical signals; an optical detection device for receiving optical signals, wherein the optical detection device includes means for automatically adjusting gain of the optical detection device responsive to one or more measurements related to the received optical signals; and a digital signal processor (DSP) for controlling the means for encoding data and the means for automatically adjusting gain of the optical detection device.

A third exemplary embodiment includes a communications system for facilitating communications across a wireless optical channel. The communications system includes: a first transceiver including a first optical transmission device for transmitting optical signals and a first optical detection device for receiving optical signals; a second transceiver including a second optical transmission device for transmitting optical signals and a second optical detection device for receiving optical signals; wherein the first transceiver and the second transceiver include means for adapting one or more components thereof during the communications across the optical channel responsive to changes in the received optical signals.

BRIEF DESCRIPTION OF FIGURES

FIG. 4 is a PPM Symbol in accordance with one or more embodiments described herein.

FIG. 5 is a Timeslot in accordance with one or more embodiments described herein.

FIG. 6 is an example of symbol synchronization statistics in accordance with one or more embodiments described herein.

FIG. 9 is an Ethernet frame to Reed Solomon block visualization in accordance with one or more embodiments described herein.

FIG. 10 is an exemplary PPM symbol encoding—PPM4_2 in accordance with one or more embodiments described herein.

FIG. 11 is an exemplary Soft Decoding of PPM3_2 symbol in accordance with one or more embodiments described herein.

DETAILED DESCRIPTION

The Adaptive Pulse Position Modulation (APPM) embodiments described herein provide a technology base to build high speed underwater optical communication systems. Such systems may include multiple sources of data from underwater assets including, but not limited to autonomous, remotely operated or unmanned underwater vehicles (AUVs, ROVs, UUVs), sensor networks, buoys and the like. It is also understood that above water or partially submerged assets may also be included in the bi-directional communication systems described herein and include, but are not limited to, ships, surfaced submarines, and other assets (manned, unmanned and autonomous). One skilled in the art will recognize the applicability of the optical communications system to communications channels spanning not only water, but crossing water-to-air, air-to-water and air-to-air interfaces.

Figure 1A:
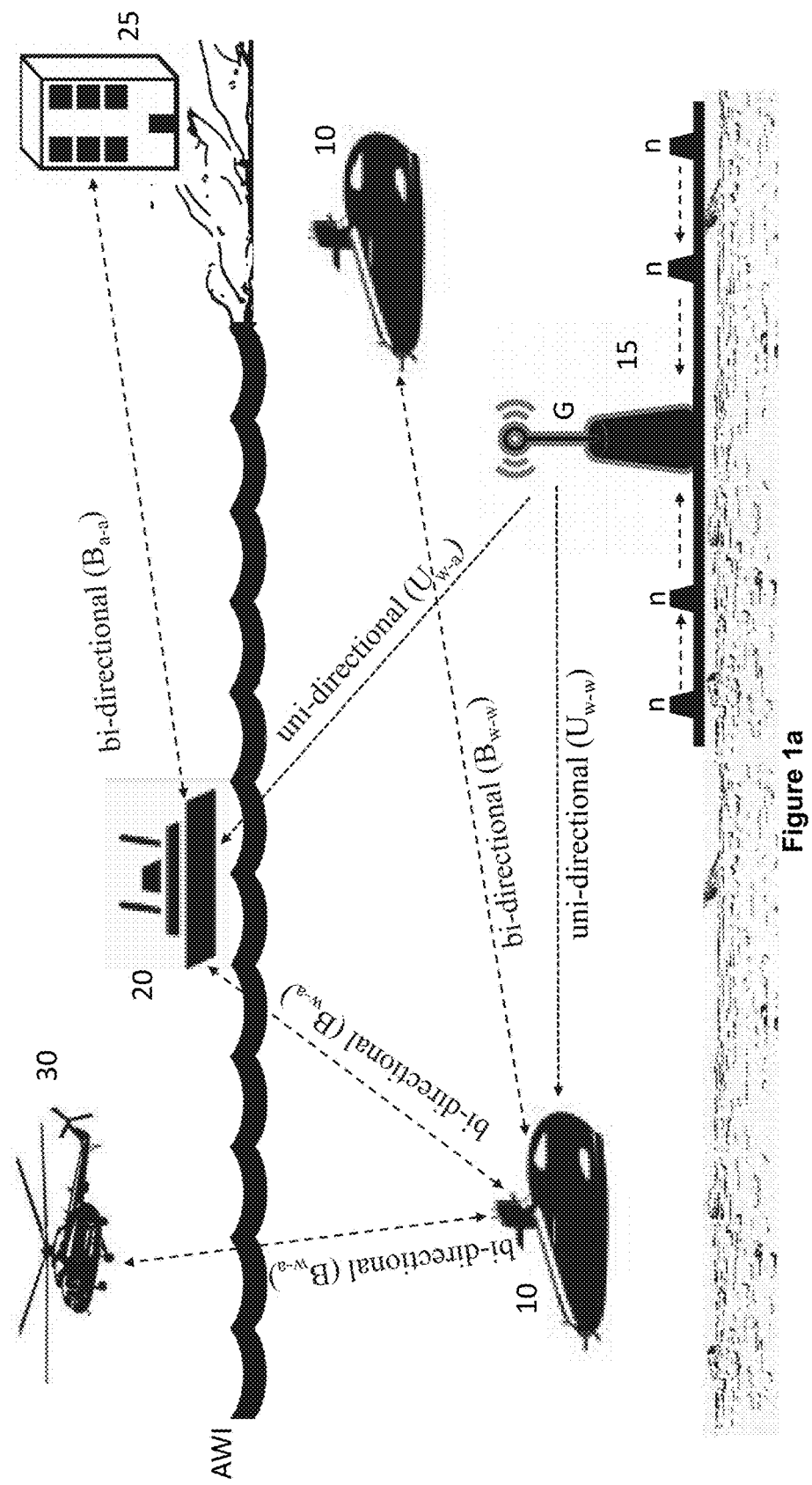
FIG. 1a is an exemplary use diagram in accordance with one or more embodiments described herein.

FIG. 1a is a schematic illustrating various exemplary implementing components and communication scenarios that are envisioned for the systems described herein below. Exemplary components include representative underwater assets, underwater vehicles 10 and sensor network 15 and above water assets, ship 20, on-land structures 25 (buildings, vehicles, etc.), and even in-air assets 30. One skilled in the art will readily recognize the sensor network 15 has having multiple nodes (n) along the sea floor (shown distributed in 2-dimensions, but could be distributed in 3-dimensions) and one or more central communication gateways (G) for communicating sensor data from the nodes (n) to at least one receiver. Further FIG. 1a also illustrates uni-directional ($U_{w-w}$) and bi-directional ($B_{w-w}$) communication scenarios wherein optical communication takes place completely underwater, as well as, uni-directional ($U_{w-a}$) and bi-directional ($B_{w-a}$) communication scenarios wherein optical communication cross the air-water (or water-air) interface. Finally, bi-directional ($B_{a-a}$) communications fully over the air is illustrated as well for context. It should be understood that the uni-directional communication scenarios could be bi-directional.

The present embodiments build on previously demonstrated feasibility of pulse position modulation (PPM) encoding and decoding using programmable logic and the realization of high speed underwater communication systems that support gigabit Ethernet communications. The earlier findings provide a clear trend that long range under water optical communications require the recovery of highly attenuated optical signals. This problem is approached by attempting to maximize the energy of the transmitter and maximizing the sensitivity of the receiver. The related problem is that both of these efforts decrease the bandwidth of the communications physical interface and result in a reduction of signaling rate. PPM offers some recovery of data rate by encoding multiple data bits in each pulse and allowing for spacing between the pulses for both the transmitter and receiver to recover for the next pulse. The embodiments described herein optimize the sensitivity of the receiver to support the maximum optical communication range possible. This high sensitivity may also be applied to optical communication systems that do not need precise pointing to operate. Together, the design features of the present embodiments illustrate a novel Adaptive Pulse Position Modulation (APPM) system intended to operate as an underwater or water-air (air-water) optical radio.

List of Symbols, Abbreviations and Acronyms

| | |
|---|---|
| AC | Alternating Current, (the time varying amplitude of the signal) |
| amp/lm | Amps per Lumen |
| APPM | Adaptive Pulse Position Modulation |
| AUV | Autonomous Underwater Vehicle |
| AWI | Air Water Interface |
| B | Byte |
| BER | Bit Error Rate |
| BERT | Bit Error Rate Test |
| CDR | Clock and Data Recovery |
| COTS | Commercial Off-the-Shelf |
| CTRL | Control |
| dB | Decibel, Log indication of amplitude = $10^{(dB/10)}$ |
| DC | Direct Current, (average value of signal) |
| Deg | Degree |
| DGM | Data Generator and Monitor |
| DIFF | Differential (logic state implemented with two signals in opposite high low states) |
| FEC | Forward Error Correction |

-continued

List of Symbols, Abbreviations and Acronyms

| | |
|---|---|
| FIFO | First In First Out |
| FPGA | Field Programmable Gate Array |
| GBE | Giga Bit Ethernet |
| GMII | Giga bit Media Interface |
| GPS | Global Positioning System |
| IRAD | Internal Research And Development |
| K | Kilo |
| LED | Light Emitting Diode |
| m | Meter |
| Mbps | Mega Bits Per Second |
| MGT | Multi-Gigabit Transceiver |
| mm | Millimeter |
| MON | Monitor |
| NEGPKMON | Negative Peak Monitor (receiver internal signal) |
| nm | Nano Meter |
| ns | Nano Seconds |
| nW | Nano Watt |
| OD | Optical Density, Log Scale, Attenuation = $10^{OD}$ |
| OOK | On-Off Keying |
| PHY | Physical layer |
| PMT | Photo Multiplier Tube |
| POSPKMON | Positive Peak Monitor (receiver internal signal) |
| ppm (lower case) | Parts per million |
| PPM (upper case) | Pulse Position Modulation |
| PPM# | With a number it refers to the number bits per symbol, PPM3 means 3 data bits per symbol and would have 8 time slots per data period. |
| PRBS | Pseudo Random Bit Sequence |
| pW | Pico Watt |
| PWR | Power |
| RF | Radio Frequency |
| RS | Reed Solomon, FEC encoding method |
| RX | Receiver |
| SGMII | Serial Giga bit Media Interface |
| SHDMON | Shut Down signal Monitor (internal signal in transmitter and receiver) |
| SMA | Small radio frequency connector |
| SMART | Specific Measureable Achievable Relevant Time-based |
| SPI | Serial Peripheral Interface (bus) |
| TCP/IP | Transmission Control Protocol/Internet Protocol |
| TEMAC | Tri-mode Ethernet Media Access Controller |
| TX | Transmitter |
| uA | Micro Amp |
| us | Micro Seconds |
| uW | Micro Watts |
| VAC | Volts Alternating Current (time varying voltage amplitude) |
| VDC | Volts Direct Current (average voltage amplitude) |
| W | Watt |
| Xmtr | Transmitter |

Definitions of Certain Terms

| | | |
|---|---|---|
| Time Slot | Basic time division of the PPM encoding method | Fixed period of time configured by link layer electronics. Current range is 6 ns to 1280 ns. |
| Sample, Sub Time Slot Samples | One fifth of a time slot | Sample Period = Time Slot Period/5 |
| Symbol | The time interval that includes the guard and data slots | Symbol Period = Time Slot Period *(Guard Slots + Data Slots) |
| Pilot Sequence | Initial symbol periods at the beginning of a burst to acquire symbol phase | Typically, Pilot Sequence = 15 * Symbol Period |
| Burst | The continuous data stream that includes the pilot sequence and a number of Reed Solomon data blocks | Burst Period = Pilot Period + RSn |
| Guard Slots | The number of time slots needed to allow the physical layer to recover | Recovery time/Time Slot Period |

| -continued | |
|---|---|
| Definitions of Certain Terms | |
| Recovery Time | The time period needed for the physical layer to recover. Measured during transmitter and receiver characterization testing |
| Data Slots | The number of time slots needed to support a specific PPM encoding depth and is equal to 2 to the Nth power, e.g., PPM2 = 4 time slots, PPM3 = 8 time slots, PPM5 = 16 time slots, etc. Data Slots = 2 ^ (PPM#) |

In realizing the APPM system, various key objectives were identified. The operation of the APPM is divided into the following main components: The optical transmitter, the optical receiver, the link layer hardware and the APPM control software. These components operate interactively to adapt the optical communication channel to the best data rate supported by the underwater channel conditions. In a first embodiment, the communication system components are symmetrical; the same transmitter design is used for both the master and slave; the same receiver design is used in both the master and slave and the same link layer design is used at both ends. The differentiation between master and slave is a configuration parameter sent to the link layer. Alternative embodiments discussed herein also describe asymmetrical system components.

Figure 1B:
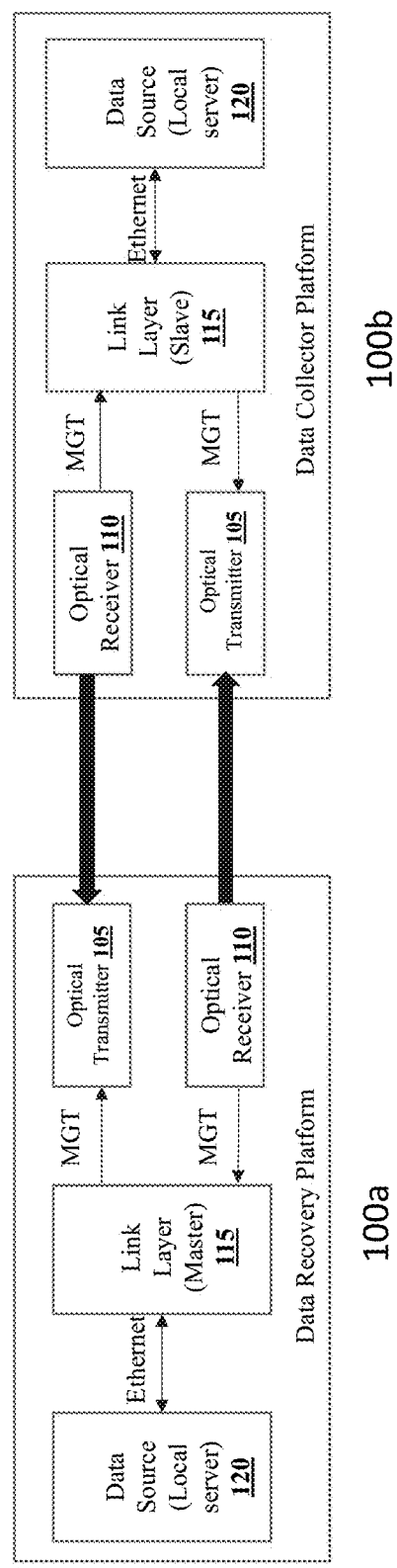
FIG. 1b is an Optical System Block Diagram in accordance with one or more embodiments described herein.

An exemplary system, which includes multiple transceiver platforms, e.g., both a transmitter platform 100a and a receiver platform 100b, and includes bi-directional communication, is shown in FIG. 1b. Each platform includes an optical transmitter 105 and an optical receiver 110, a link layer 115 and a data source, e.g., local server, 120. By way of example, referring briefly back to the components of FIG. 1a, FIG. 1b is representative of the on-asset components and bi-directional interaction between, for example, the underwater assets 10. For the case of uni-directional assets, e.g., sensor system 15, the optical communications platform would not require the optical receiver component 110 as the exemplified sensor system 15 is transmit only and does not receive.

A key objective was to select components and a system design that could be configured for many different operational environments. In a first embodiment, an LED was selected as the optical signal generation technology (optical transmitter 105). The use of the LED allowed unconstrained selection and evaluation of signal conditions at lower signal modulation rates which were expected to be the best at achieving long link ranges in underwater communications. The second selection was the use of a PMT as the optical sensor (optical receiver 110) for the APPM system. The PMT has the highest known optical gain of commercially available optical sensors. The high gain results in a receiver with the best signal sensitivity and supported the design of an optical system that would have the best range for under water communications. Forward Error Correction (FEC) was used to provide the best signal recovery in high loss noisy signal conditions. Research into other optical communication systems indicated that a combined use of Convolutional and Reed Solomon error correcting codes would provide the best method to recover signals with low signal to noise ratios. Both of these blocks are available as cores for the FPGA and allowed direct application of this technology to the APPM system.

A new Bit Error Rate Test (BERT) tool was designed to evaluate early prototypes of the physical interface. This tool was developed and used to perform preliminary evaluation of the bandwidth of LED optical transducers and established specific requirements for the design of the transmitter circuit board. This tool was also critical for the physical layer integration and supported the performance improvement effort for the receiver. The tool provided controls to configure the pulse position wave form for 2 to 10 data bits per symbol and decoded the receive signal and measure the BER for the channel. This tool is part of the link layer and supports characterization of the performance of the optical channel in different operating environments.

The optical transmitter 105 converts the electrical signal generated by the link layer into an optical pulse. The optical transmitter includes the optical emitter and the features to control the precise timing of the optical emission. The demonstration optical transmitter included the power control and fast switching to directly modulate the current in a light emitting diode to create the PPM optical pulse.

An optical receiver 110 using a PMT sensor includes the design of the power supply used to supply a configurable bias to the PMT cathode to allow control of the internal signal gain of the device. The optical receiver 110 also includes the high frequency preamplifier of the anode signal and the circuits to convert the analog signal into an interface to the link layer hardware. The receiver performance exceeds the signal sensitivity target of 1 nW peak optical input signal recovery and was able to recover signals as low as 0.09 nW peak pulse optical signal strength. The PMT required that all signal gain and signal processing be performed with DC coupling between stages to operate over the full range of signal level conditions.

Link layer signal conditioning circuitry is designed to take data sent from an Ethernet source and encode the data into the PPM data format for the transmission of the data by the optical transmitter. The link layer hardware is also responsible for translating the pulses from the optical receiver back into the data to be forwarded on the Ethernet interface. The link layer successfully performed both the data encoding and data decoding measured during the test phase. Figures of merit reported for the APPM system operation are measured while sending data across the link using the link layer. The link layer is an important component of the adaptability of the PPM system. The link layer hardware includes all of the configuration controls that allow selection of: the data rate, the data density, control of the FEC overhead and provides the physical interface to the serial port that controls the transmitter amplitude and the receiver gain. These features were tested and supported the performance evaluation of the APPM system.

Integrated testing of the APPM with the transmitter, receiver and link layer hardware demonstrated operation from PPM2 to PPM10 and with time slot timing from 10 ns to 1280 ns. The integration testing includes sensitivity testing at the 320 ns and 1280 ns time slot settings. Integration testing also included a demonstration of bi-directional optical communications.

A challenge for underwater optical communication is building a system that correctly adapts to the signal loss that occurs as light passes through water. A linear increase in link range requires an exponential increase in the system link margin. The goal was to build a system that could operate with a link loss of one thousand to ten million. The adaptability of the system is to sense the state of the receiver and make the adjustments while the system is communicating data to optimize the channel transfer rate.

There are a number of controls that have been built into the APPM to allow it be preconfigured to dynamically adapt to the signal sensed by the receiver. In this mode, several optical receiver parameters are automatically controlled. The PMT gain is exponentially related to the bias voltage applied to the dynode chain and the cathode of the device. The voltage applied to the cathode is a configurable parameter in the PMT receiver board. The receiver board also senses the strength of the average signal detected at the anode terminal and the strength of the AC signal at the anode. These signals are monitored and the cathode voltage setting is reduced if the anode signal rises too high. The receiver also measures these parameters and provides the signal strength information to the APPM control system. This information is used to estimate the optical energy that is being received by the PMT and set the cathode voltage to value that provides the best dynamic range. The APPM system also supports control of the data rate and the data density of the pulsed code signal stream. Generally, the longest optical communications ranges are supported at the lowest data rate. Control of these parameters allows the system to select an encoding method that best utilizes the quality of the signal and signal strength to optimize the data transfer rate.

The operational concept includes the following phases of operation: initial positioning, link initiation, data transfer and link termination. The positioning phase brings the two transceivers within optical range. Depending on communication modality (UW to UW, AW to UW), this phase can be performed either from known geo-position information or acoustic beacon. Once within optical range, the master transceiver begins optical beaconing with the best sensitivity setting for the communication link. This setting would be the lowest data rate configuration with the slowest signaling rate. The slave transceiver detects the master's beacon and responds at the same slow signaling rate. At this stage, the system begins transmission of status information across the optical link so the master transceiver gains knowledge of the operating conditions at both the master and the slave transceiver. The master can then coordinate a modulation adaptation when the signal strength at both the master and slave indicates stable operation and adequate link margin exists that can be assigned to an improvement of the data rate. This process continues throughout the communications period adapting to the best encoding method supported by current link conditions.

Figure 2:
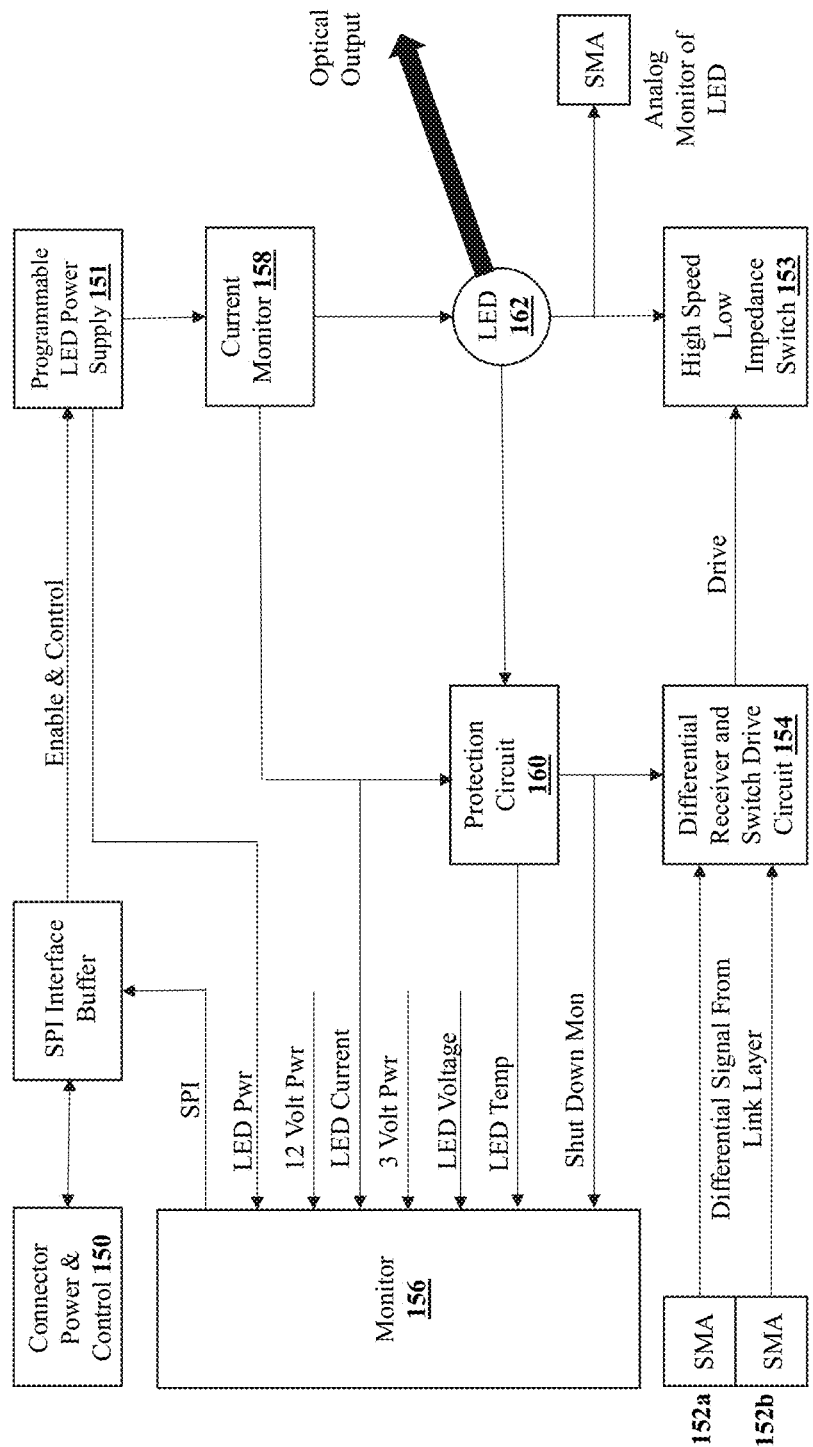
FIG. 2 is an Optical Transmitter Block Diagram in accordance with one or more embodiments described herein.

FIG. 2 shows the integrated functions of the LED transmitter 105 in accordance with a first embodiment. The card is powered and controlled through the Connector Power & Control 150. All functions on the card are powered from a single 12 volt input source. The card is controlled through a serial peripheral interface bus (SPI). This interface is used to initialize the programmable LED power supply 151 and to enable operation. The LED optical output pulse is commanded by a differential signal from the link layer. This signal interfaces to the two SMA connectors 152a, 152b.

The LED current is directly modulated by a high speed low impedance switch 153 that is driven by the differential receiver and switch drive circuit 154 based on the differential signal from the link layer. The control of the output power of the LED optical signal allows the system to be configured for lower link loss operation. The amplitude control supports 20 dB of change in the power of the optical output.

The design includes a monitor 156 which reports the status of the key performance indicators of the LED transmitter to the link layer electronic through the SPI interface. The device monitors the local power supplies to aid in fault isolation as well as the status of the protection parameters using the current monitor 158 and protection circuit 160. This allows the control system to detect if there is a problem with the LED 162 and change the LED power supply to correct the situation. The drive voltage of the LED 162 is also available as an analog monitor point as well as an internal monitor. The analog monitor supports the device characterization testing. The analog monitor allows for direct LED performance monitoring and to detect age and stress induced degradation of the LED operation. A damaged LED will show a drop in the internal resistance of the diode if over-stressed. This is detected by measuring the drive voltage, the source voltage and the diode current.

The design includes protection features to prevent damage to the LED. The primary failure mode for the LED is excessive heat generated by the current through the voltage drop of the diode junction. Both the current and the temperature of the LED are monitored and are automatically reduced to keep the device in safe operating regions.

Figure 3:
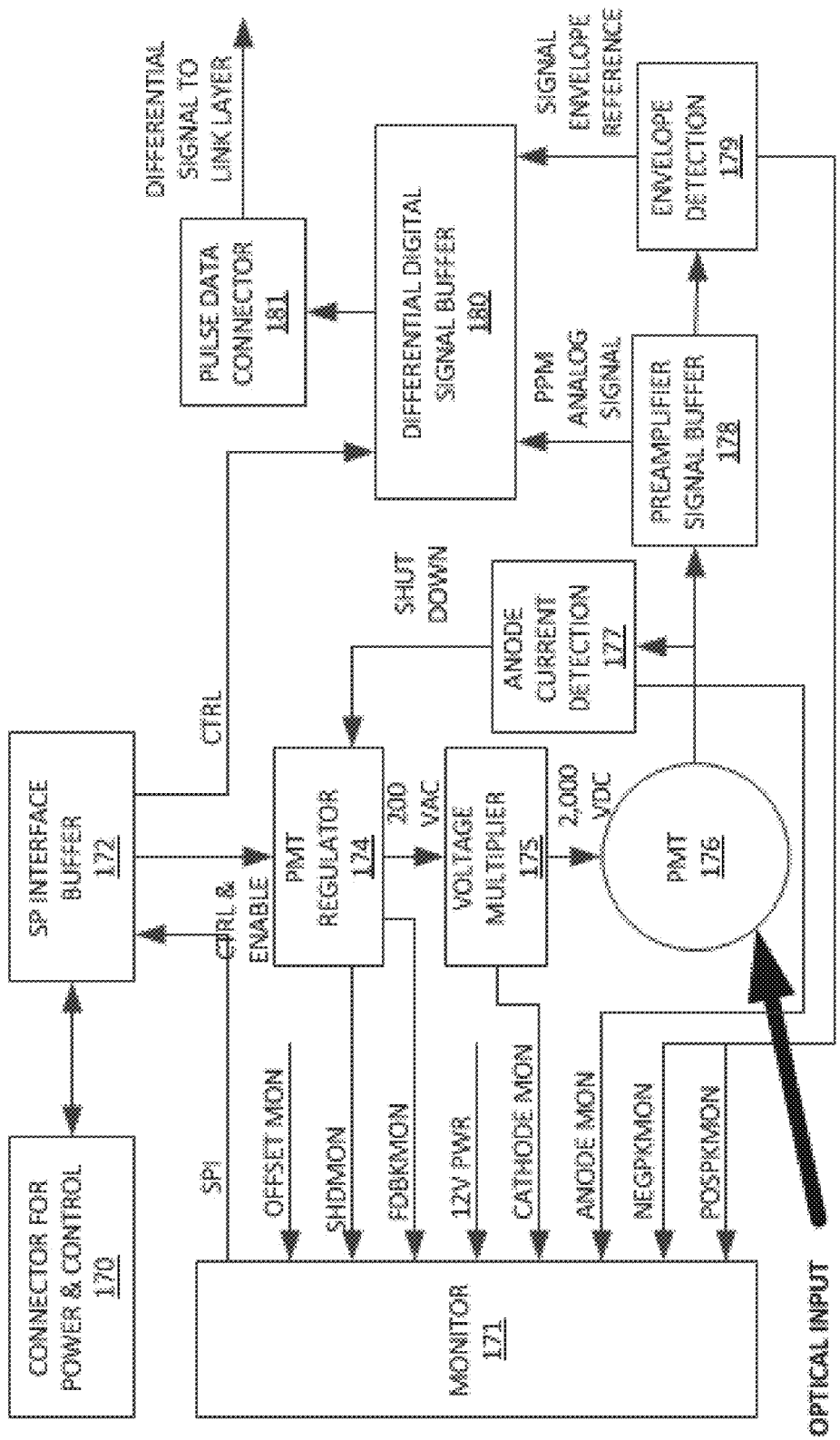
FIG. 3 is an Optical Receiver Block Diagram in accordance with one or more embodiments described herein.

FIG. 3 shows the functional organization of the APPM optical receiver 110. Basic operation consists of the application of 12 volt power to the connector for power and control 170 and sending an initialization command to the PMT regulator 174 through a serial peripheral interface buffer 172. This command sets the voltage that is applied to the PMT cathode and dynode chain and controls the gain of the photo electrons that are incident on the PMT cathode. The signal from the PMT 176 is sensed at the Anode output and is amplified by a RF preamplifier 178. The output of the preamplifier is monitored by the envelope detection 179 to determine the best switch reference voltage of the PPM analog signal. The signal envelope reference, with the PPM analog signal, is connected to the differential digital signal buffer 180. The buffer amplifies and limits the signal to provide a differential signal to the link layer. The signal is connected to high speed cabling to the FPGA through pulse data connector 181.

The APPM optical receiver design was weighted to produce a device with best in class optical sensitivity. The optical sensor selected to support this objective was a photo multiplier tube (PMT). This is a mature technology that is able to provide high gain of the photo-electron current created by the photons that enter the cathode of the PMT. The device selected was rated with a nominal gain of 5 million amp/lm. The detector sensitivity is also improved by increasing the active area of the cathode. This allows sampling for light over a larger surface. The PMT selected has an active area of 46 mm. One skilled in the art recognizes that PMT selection may vary in accordance with particular requirements and constraints for implementation of the APPM system. Additionally, multiple PMTs may be employed.

The PMT regulator 174 control interface receives a serial command and converts this signal into an analog reference. This reference is compared to a DC feedback voltage from the collector dynode in the PMT and the PMT regulator 174 will apply more energy to increase the collector voltage to the desired level. The PMT regulator 174 also receives an enable signal from the SPI bus, as well as a shutdown signal from the anode current detection 177. The PMT regulator 174 will only generate an output voltage if the enable command is present and there is no shutdown signal. An oscillator converts the 12 volt input power into a higher level AC voltage the amplitude of which is set by the regulator command. A voltage multiplier 175 uses a diode capacitor ladder network to multiply the regulator AC output and rectifies and filters the DC bias to the PMT cathode and dynodes. A 2 times multiplier is also employed to bias the PMT collector for final anode gain.

The electrical signal at the anode terminal is a low voltage signal that requires additional electrical gain before conversion to a digital signal. This gain is provided by a variable gain high frequency amplifier in the preamplifier signal buffer 178. This amplifier increases the low pulse signals from the anode that are between 1 uA and 100 uA and provides up to 50 dB of gain to allow the signal to drive differential signal buffer 180. As the input signal increases, the preamplifier gain is automatically reduced to prevent saturation of the analog process of the channel. This amplifier allows the output of the receiver to have rapid automatic gain control and maintain accurate signal decoding.

An envelope detection 179 circuit follows the preamplifier signal buffer. This circuit captures the positive peak signal and the negative peak of the signal and outputs the average of these to levels as the signal envelope reference to the differential digital signal buffer. The dynamic generation of the signal envelope reference allows the accurate phase capture of the PPM analog signal and automatically adapts as the input signal changes strength.

The differential digital signal buffer 180 takes the PPM analog signal output of the preamplifier signal buffer 178 and the signal envelope reference output of the envelope detection 179 circuit and converts the analog signal into a high or low logic state. This output is sent as a low voltage differential signal to the link layer electronics to capture the pulse phase that is used to decode the symbol data. The buffer also includes a programmable detection offset to optimize the signal detection phase. This is helpful as the duty cycle of the signal shrinks as more phase positions are added to the signal to increase the data bits per symbol.

The receiver includes a monitor 171 that reports the voltage of critical analog states in the operation of the receiver. This information is used by the APPM control software to detect the strength of the incoming signal and configure the receiver for optimum gain and control analog to digital conversion. The monitor 171 also aids in the receiver self-test performance to determine if all features of the component are functioning correctly. A third important use of the monitor 171 is to support automated data collection that supports characterization testing performed during the APPM development cycle.

The PMT 176 can be damaged if the cathode bias voltage is too high for the optical input signal power. This condition can create excessive currents in the cathode to anode dynode stack of the PMT. If excessive cathode current is allowed, permanent sensitivity loss may occur for the detector. If the current is exceeded in the dynode stack, then the gain of the PMT can be permanently degraded. To prevent this damage the receiver includes anode current detection 172 and will automatically reduce the cathode voltage bias limiting the currents to safe operating levels by sending a shutdown signal to the PMT regulator 174.

The PRBS test configuration provides physical layer testing capability. The features of the design includes: Variable MGT sample rate (500 Msps-6.6 Gsps); Variable Timeslot oversampling rates (40×, 80×, 160×, 320×, 640×); Variable PPM levels (PPM3-PPM10); Variable guard slots per symbol (1-2047); Variable pulse width; Two line encoding options (PPM and OOK); PRBS generation and monitoring (both PRBS-7 and PRBS-31 supported); Static pattern; Variable pulse filter (edge detector); Hard PPM Decoder with symbol statistics.

Symbol synchronization is achieved by collecting timeslot statistics over a large number of symbols (1000s). Selection of the most likely timeslot occurs via software by inspecting each possible symbol alignment.

Timeslot synchronization is achieved with a hardware CDR block that automatically adjusts the timeslot boundary when five consecutive edges in the same sample slot are received.

Figure 4:
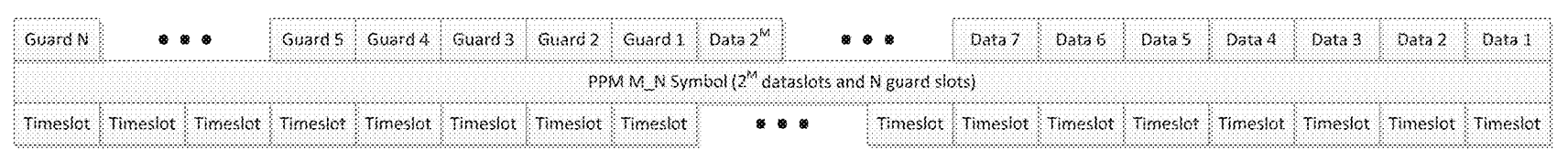

A PPM symbol consists of a power of two data timeslots followed by an integer number of guard timeslots. See FIG. 4 for a visualization of a PPM symbol. Note that symbol transmission takes place from right to left (rightmost bit sent first).

Each timeslot consists of five single-bit samples. To increase the range of possible timeslot frequencies, integer oversampling is used. The oversampling rate can be configured as 8, 16, 32, or 64. See FIG. 5 for a visualization of a timeslot and FIG. 6 for example symbol synchronizations statistics.

The link layer design adds a half-duplex master/slave link to the existing testing design. The added features of the link layer design are: Variable rate inner code FEC: Convolutional Encoding/Viterbi Decoding with supported Rates 1/2, 1/3, 1/5, 1/7; Fixed outer code FEC: Reed Solomon (RS) rate 14/15 (K=56, N=60); Variable pilot length (1-15 symbols); Configurable pilot symbols; Variable burst length: (1-255 RS blocks); Variable (static) burst period; Variable PPM Soft Decoder.

A first link layer embodiment supports two data sources: Built-in hardware data generator/monitors (for synthesized data packets) and Gigabit Ethernet (including jumbo packet support).

Figure 7:
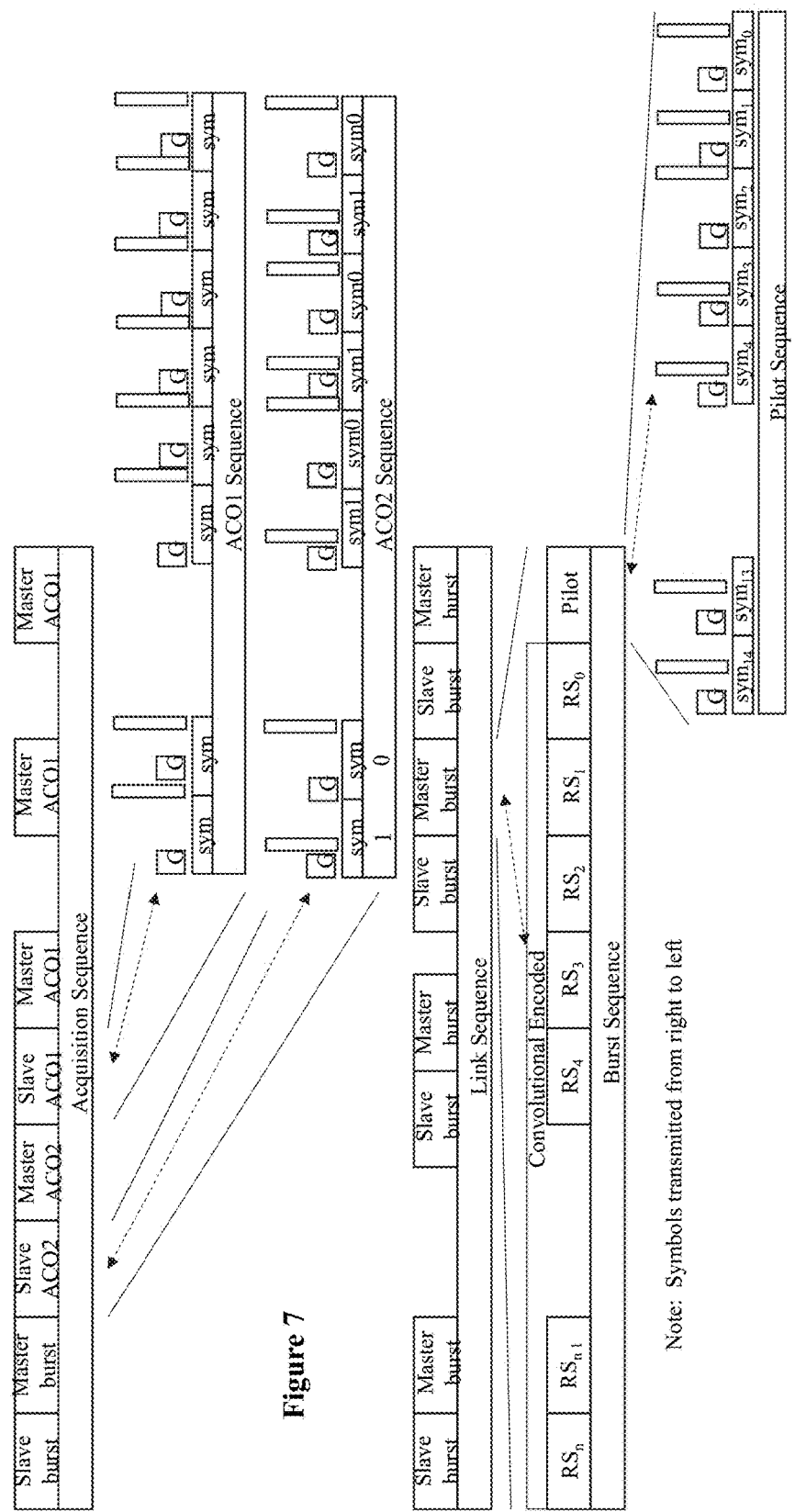
FIG. 7 is a link visualization in accordance with one or more embodiments described herein.

In an exemplary embodiment, link operation is initiated at the master by repeatedly transmitting an acquisition burst and listening for a response. The slave remains silent (listening only) until an acquisition sequence has been received. The slave continues the acquisition sequence by responding (transmitting) with its own acquisition burst. Once both sides have acknowledged the other's presence, the link goes operational. An exemplary link visualization is shown in FIG. 7.

While the link is running, at least two conditions will cause the link to re-initialize: Too many uncorrectable blocks in the Reed Solomon decoder and too many missed burst receptions (pilot search failed during burst reception).

Timeslot and Symbol synchronization are achieved in the link layer with a set of pilot symbols, which occupy the initial set of symbols of each burst transmission. A pulse correlation is performed over all sample offsets looking for a match to the expected pilot sequence. The correlator is looking for a ten-sample window (five zeros followed by five ones) for the pulse from each symbol.

Configuration of the design takes place from a register interface accessed through the onboard processor.

The communications overhead in this design comes from many sources: Ethernet (0.4%-33%)—fixed 38 bytes per frame; Worst case 64 B packet, best base 9000 B packet; TCP/IP (166%-0.4%)—fixed 40 bytes per packet. Worst case 24 B message, best case 9000 B message; Framer (1.7%-3.5%)—worst case 2 B per block, best case limit is 1 B per block; RS FEC (7.1%)—fixed 4 B per block; Convolutional (0%, 100%, 200%, 400%, 600%)—for rates 1/1, 1/2, 1/3, 1/5, 1/7; Pilot (0.8%-15.4%)—up to 15 symbols per burst. Worst case PPM10_1 convolutional rate 1/7 with one RS block. Best case PPM2_1 with no convolutional encoding with one RS block.

Overhead rates are minimized with: Large messages (jumbo packets); Longer bursts (as many RS blocks as possible) and Weakest FEC (no convolution).

Figure 8:
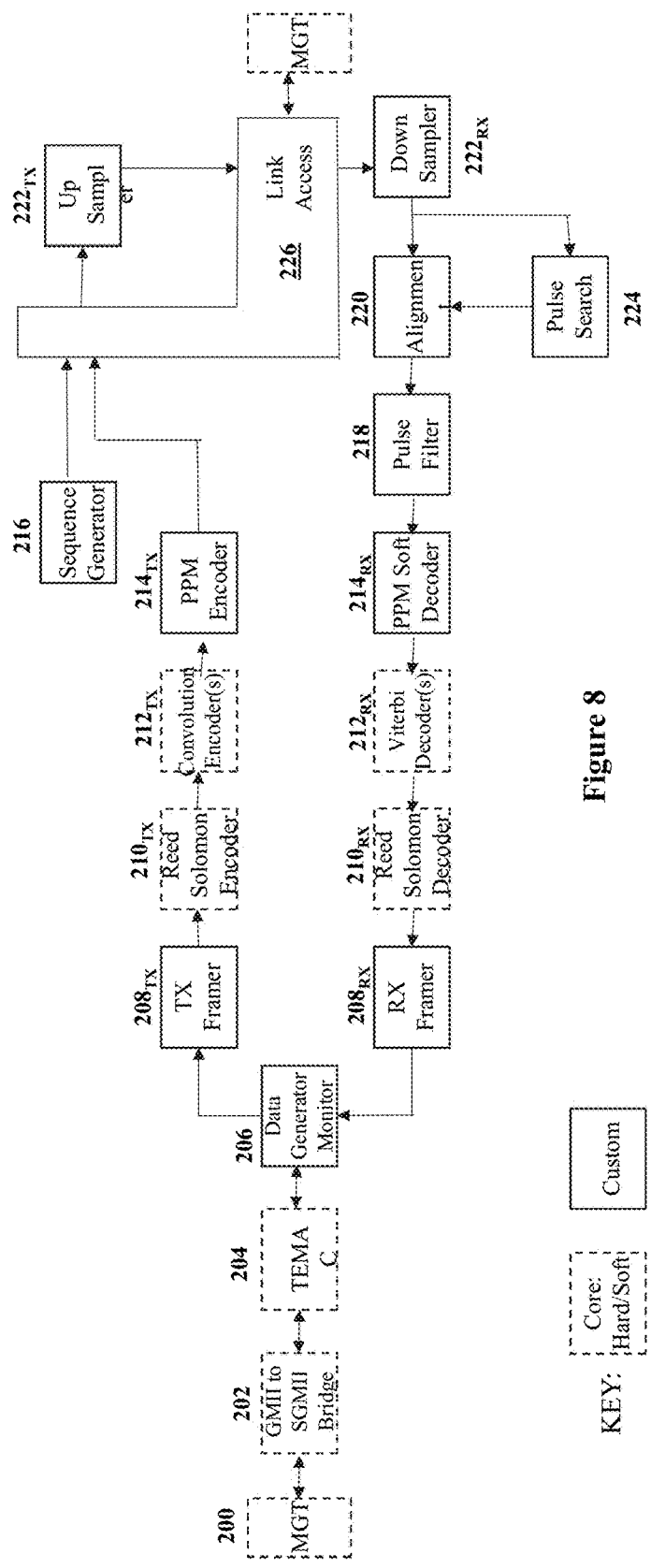
FIG. 8 is a data path in accordance with one or more embodiments described herein.

The major data path blocks of the link layer (FIG. 1b, 115) design in accordance with one embodiment are shown in FIG. 8. Crosshatched blocks are COTS or generated cores (either hard—built in to the device, or soft—designed in fabric). As shown in FIG. 1b 100A, the connections to the optical transceivers are on the right, while the Ethernet side of the design is on the left.

The GMII-to-SGMII Bridge 202 and TEMAC 204 are both COTS cores. The PHY used in this design is a SFP copper GBE module. It is connected over a high speed serial port (MGT) 200 using the SGMII protocol.

The data generator/monitor block (DGM) 206 can pass GBE/Framer data through (bypass mode), or can be used to source/sink synthesized data. The DGM is used to during testing phases to generate packets of variable lengths.

Figure 9:
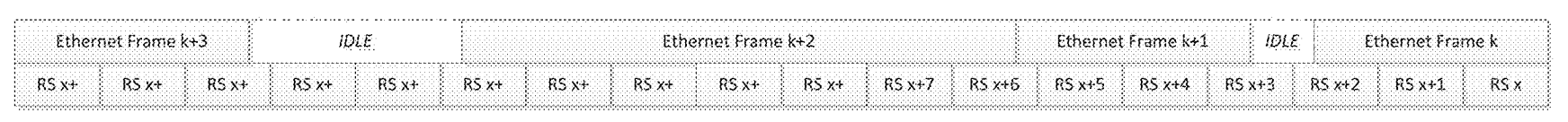

The framer modules ($208_{TX}$, $208_{RX}$) convert variable sized Ethernet frames into fixed sized blocks of data to be communicated over the optical link to the Reed Solomon Encoder/Decoders ($210_{TX}$, $210_{RX}$). The length of the fixed size blocks matches the Reed Solomon un-coded block size (56 bytes). When no Ethernet frame is available, "idle" data is encoded into the framer block. See FIG. 9 for a visualization of the relationship between Ethernet frames and framing blocks. The RX framer also must deal with lost frames. When an RS block fails decode, the Ethernet frame must be dropped. The RX Framer must then search for the beginning of the next Ethernet Frame in the incoming framer stream.

The FEC cores for encode/decode are placed in series. The Reed Solomon encoder 210TX adds 4 addition bytes to a block of 56 bytes. This allows the detection and correction of up to 2 bytes when the signal is processed by the Reed Solomon decoder 210RX when the RS block is received. The Reed Solomon encoder 210TX provides signal data to the convolutional encoder ($212_{TX}$), this block provides redundant bits to support data recovery from high bit error rate loss. The Viterbi decoder 212RX is a block that detects and corrects errors in the received convolved data stream and then outputs the corrected data blocks to the Reed Solomon decoder (210RX).

The PPM encoder ($214_{TX}$) generates PPM symbols from the FEC encoded bit stream. The position of the pulse in the symbol is encoded with a gray code to limit small synchronization errors to one bit. For example, see FIG. 10 for an example of PPM4_2. A symbol for the data value 15 would have a pulse in the 11$^{th}$ data slot of the symbol. If the pulse were to be received one timeslot early or late, only a single bit would be in error (either '1110' or '1101' compared to the original '1111').

The sequence generator 216 is used to create both acquisition bursts as well as all pilot sequences.

The up/down sampler blocks ($222_{TX}$, $222_{RX}$) are used to convert the sample stream (five samples per PPM timeslot) into the raw 8×, 16×, 32× or 64× rate on the optical link. The down sampler converts into a sample of '1' when at least half the oversamples contain ones.

The PPM soft decoder ($214_{RX}$) computes the probability that each decoded bit in a symbol is either a one or zero. This soft information is used by the Viterbi decoder ($212_{RX}$) to significantly improve the BER performance of the decoder. The Viterbi decoder core is configured to use four bits of soft information per bit (signed magnitude format). The soft information is computed by recording the number of samples that indicate a '0' verses a '1'. The majority wins with a tie going to last loser. The strength of the bit is determined by dividing the winning count by the total samples (ones count plus zeros count). See FIG. 11 for an example of decoding a pulse that spans two timeslots.

The Pulse Search module 224 is a configurable pulse correlator. It is used to detect acquisition sequences and pilot sequences. In acquisition phase it looks to a single or dual repeated symbol pattern, while in pilot mode it is matching against the currently configured pilot sequence. The 'detection' threshold is configurable. The module searches for a match on all five sample phases.

The Pulse Filter 218 is used to reduce pulses of length greater than one time slot. The filter is configured to look for pulse lengths greater than 3, 4, or 5 samples. Once a pulse is found, the filter cannot trigger again until the current number of guard timeslots have passed. In a system configuration with pulse stretching, the BER of Viterbi suffers greatly when no filtering is enabled.

The alignment module 220 is used to generate a time slot and symbol aligned data stream to send to the symbol and FEC decoders. Once the pulse search module identifies a match on one of the five sample phases, it signals the alignment module.

The Link State/Access module (226) generates all the timing for control of the half-duplex master/slave link. This includes control of both transmit and receive for both master and slave. The module also tracks link state from acquisition through normal operation.

Figure 12:
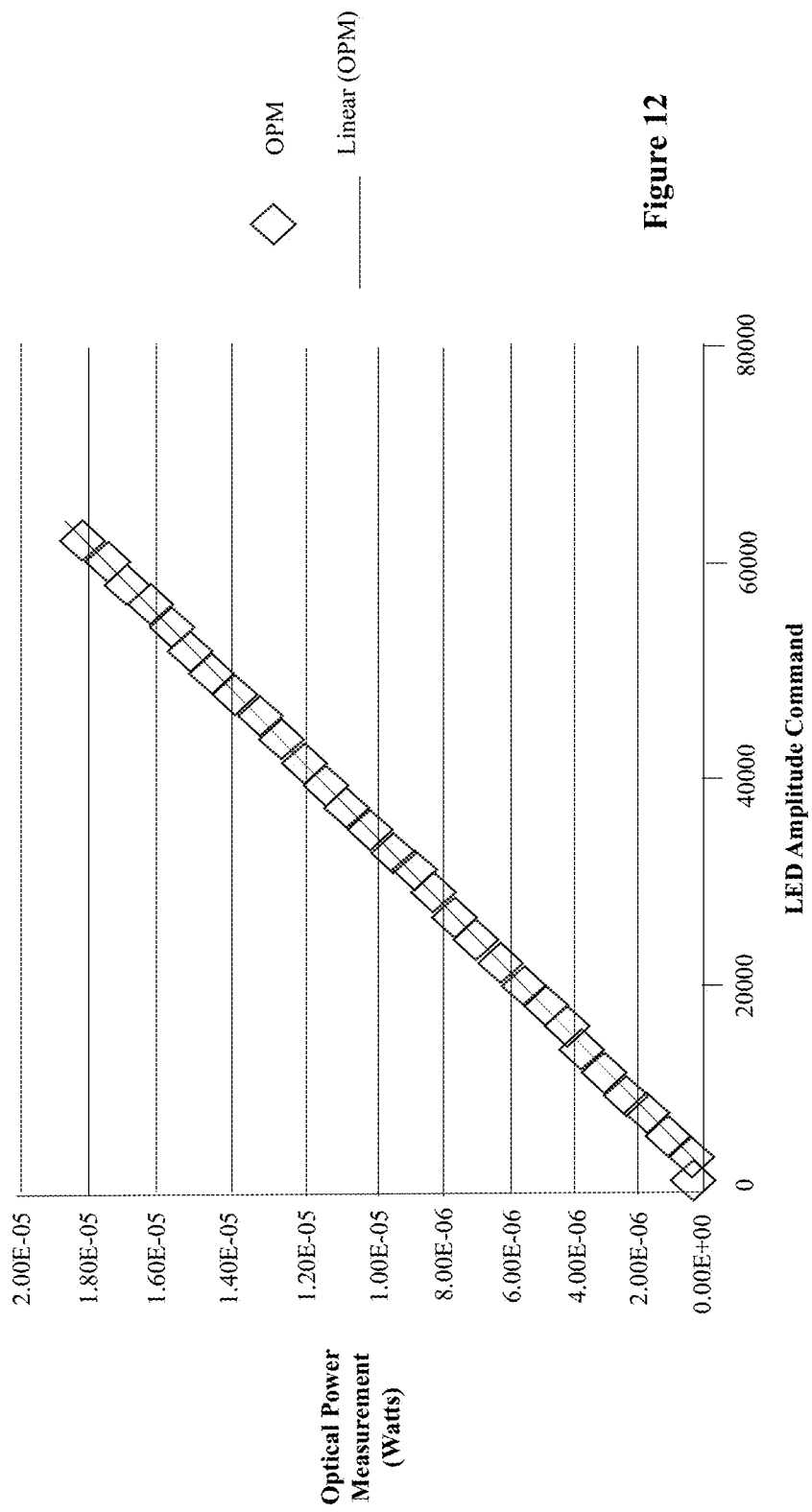
FIG. 12 is illustrates LED Optical power measurement versus transmitter command in accordance with one or more embodiments described herein.

The test stand was used to measure the change in the optical output power versus the command to the transmitter card. The optical response has good linear response to the command. The LED optical output has 20 dB of control for setting the amplitude of the optical output of the APPM transmitter. FIG. 12 illustrates plot of LED optical power measurement versus transmitter command.

Figure 13:
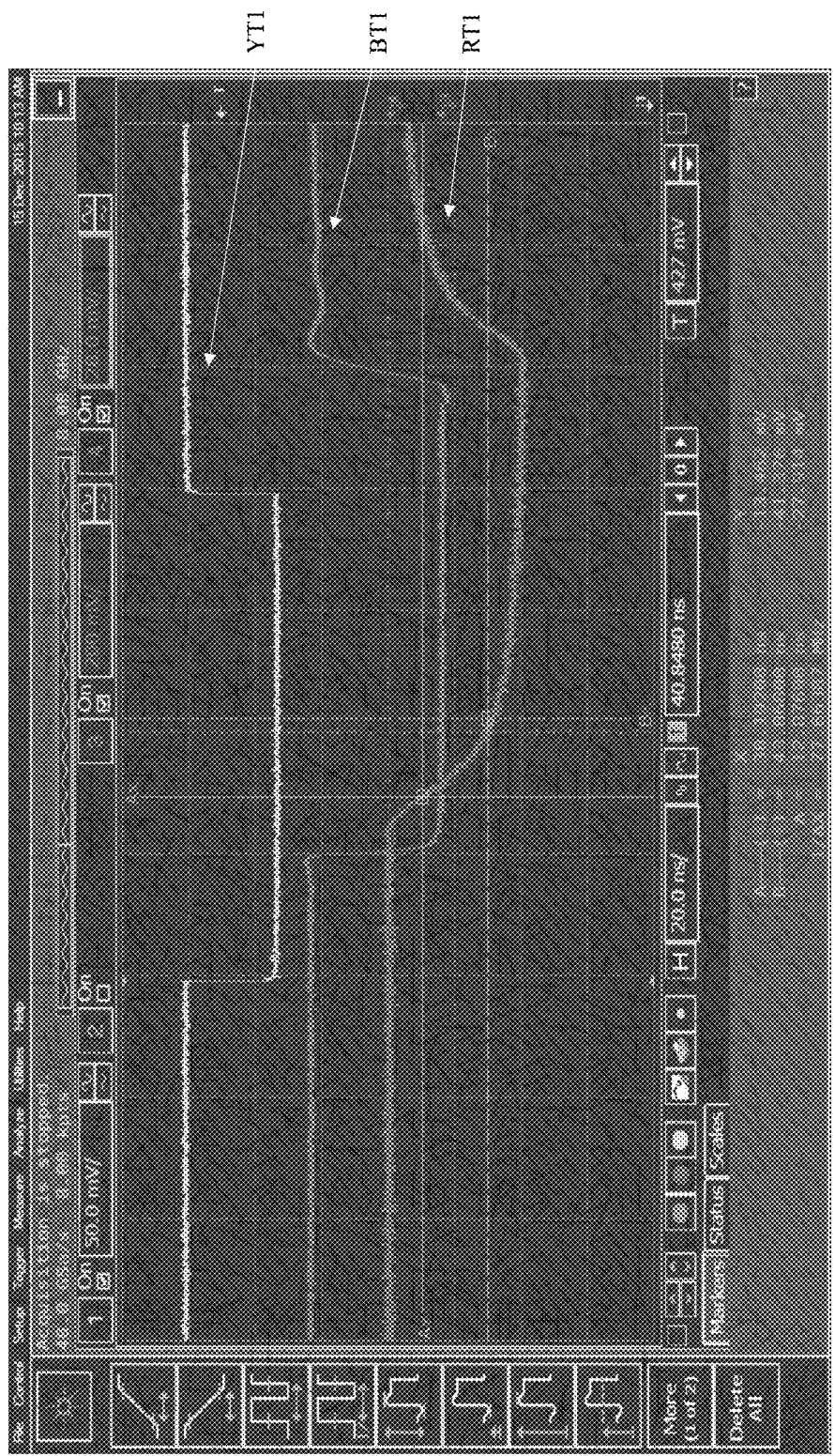
FIG. 13 is an exemplary transmitter optical switching rate in accordance with one or more embodiments described herein.

The optical response of the LED to an applied voltage has a response time of 12 to 20 ns. This is true for both the LED activation and deactivation. This behavior is shown in the signal capture of FIG. 13. The yellow trace YT1 is the command signal to the transmitter board. The blue trace BT1 is the voltage command to the LED. The red trace RT1 is an optical signal monitor of the LED output. This bandwidth constraint is the primary data rate limitation of the APPM system and is a direct function of the physical structure of the LED. The LED has a large junction area, this area acts like a capacitance that must be charged to turn on the current to flow through the junction. The only alternative is to move to a faster modulation source for the transmitter if a higher data rate is needed for a APPM application.

Figure 14:
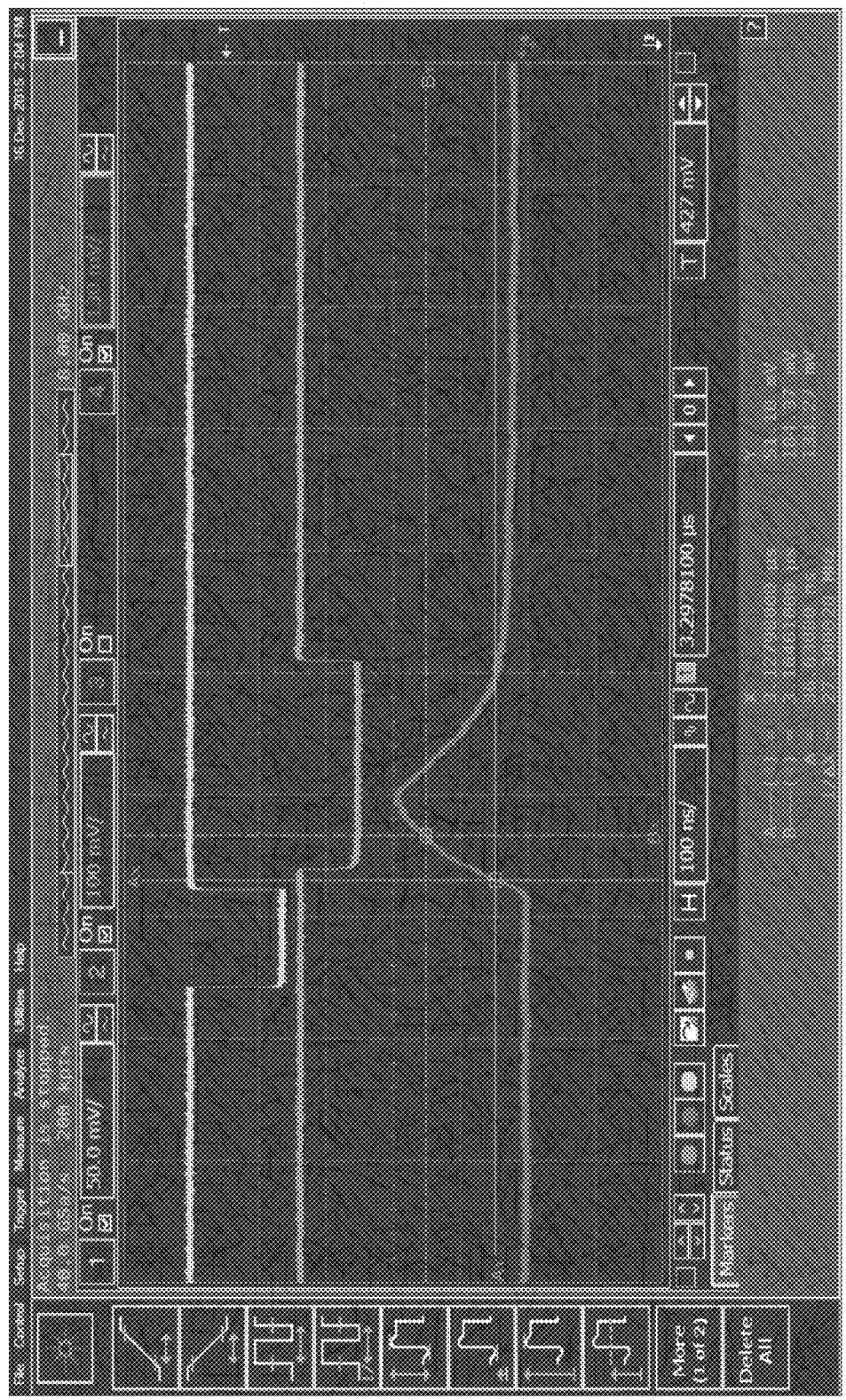
FIG. 14 is an exemplary receiver optical response time in accordance with one or more embodiments described herein.

The receiver bandwidth is dominated by the pulse rise time. The signal amplification in the PMT dynode chain is non-linear and results in a signal with a faster rise time than fall time. The signal captured from the oscilloscope in FIG. 14 shows the rise time with a 80 ns time slot signal from the LED transmitter. The rise time shown in the 20% to 80% transition time is 36 ns. The fall time of the signal is 76 ns. The receiver may support faster data signaling than is currently supported by the LED transmitter. The top yellow trace YT2 is the transmitter input signal, the bottom red trace RT2 is the PMT analog output and the middle green trace GT1 is the digitized signal output from the receiver to the FPGA link layer hardware.

Figure 15:
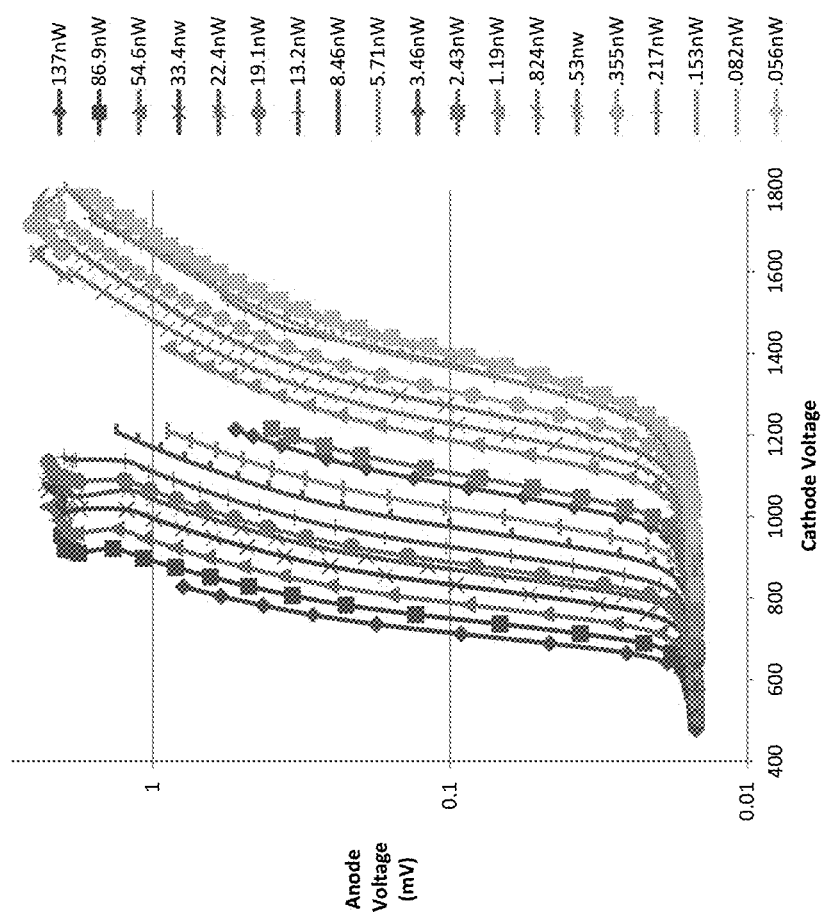
FIG. 15 is an exemplary anode voltage versus cathode voltage for multiple optical power inputs in accordance with one or more embodiments described herein.

The data plot in FIG. 15 shows the family of curves for a long time slot signal of 1280 ns. Each curve is the anode voltage versus the programmed cathode voltage for different optical input power into the PMT. The plot shows the exponential decrease in optical signal strength requiring a linear increase in the cathode voltage to create the gain necessary to recover the signal. This relationship supports estimation of the input optical signal strength by measurement of the anode voltage monitor and increasing the value by the power factor equivalent to the cathode voltage setting.

Figure 16:
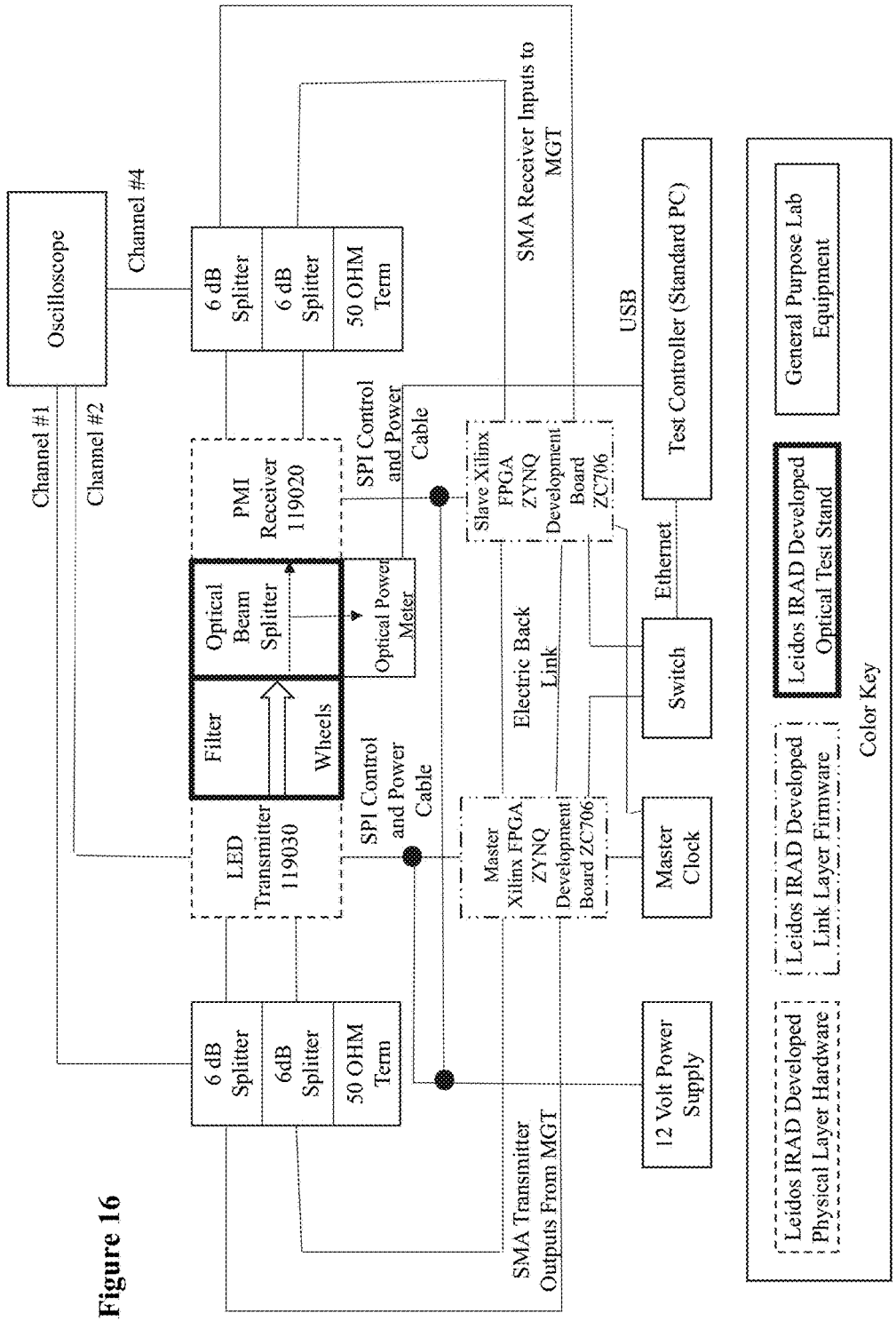
FIG. 16 is an exemplary integration test configuration block diagram in accordance with one or more embodiments described herein.

The integration tests were performed with an optical attenuator used to simulate the signal loss associated with light transmission through water. The integration tests used the optical physical layer components for the communication link from the master to the slave. The back channel link was provided by an electrical connection for these tests. The diagram in FIG. 16 highlights the topology of the link layer test set up. The test controller provided control of the APPM system components and allowed for automated data collection of the test environment and the collection of the link status indicators provided by the link layer hardware.

The link layer options were tested across the range of a data density from PPM2 to PPM10. This range was the intended goal of the design and all operated successfully. The link layer options for data rate were also tested across the full range of configuration from fast pulses of 20 ns to slow pulses of 1280 ns. Table 1 below summarizes the performance at each of the configurations tested. The figure of merit for each configuration is the ratio of lost data blocks to the number of received data blocks. An ideal link would have zero lost blocks. A typical link has a small number of lost blocks that are flagged by the TCP/IP and retransmitted.

TABLE 1

| | PPM | 2 | 3 | 4 | 5 | 6 | 7 | 8 | 9 | 10 |
|---|---|---|---|---|---|---|---|---|---|---|
| Time | 1280 | 0.000 | 0.000 | 0.000 | 0.000 | 0.000 | 0.000 | 0.000 | 0.000 | 0.000 |
| Slot | 320 | 0.002 | 0.001 | 0.000 | 0.000 | 0.000 | 0.000 | 0.000 | 0.000 | 0.000 |
| Length | 80 | 0.000 | 0.000 | 0.000 | 0.000 | 0.000 | 0.000 | 0.000 | 0.000 | 0.000 |
| (ns) | 20 | 0.076 | 0.000 | 0.000 | 0.000 | 0.000 | 0.000 | 0.000 | 0.000 | 0.002 |

The data transfer rate is a function of both the length of a time slot and the PPM level that encodes multiple bits per pulse. The data transfer rate increases linearly with a decrease in the time slot time. This is a pattern that continues to improve timing until the bandwidth limitations for the physical layer are encountered. With the current system the shortest time slot time is 20 ns. The data transfer also increases with decreasing PPM. Low PPM encoding sends fewer bits per pulse but the symbol time increases exponentially with each extra bit. Table 2 below provides the data rates for each of the combinations of time slot length and PPM configurations.

TABLE 2

| | | | | | Data Rate for Tested Link Layer Encoding (Mbps) | | | | | |
|---|---|---|---|---|---|---|---|---|---|---|
| Guard | | PPM | 2 | 3 | 4 | 5 | 6 | 7 | 8 | 9 | 10 |
| 4 | Time | 1280 | 0.037 | 0.037 | 0.029 | 0.020 | 0.013 | 0.0078 | 0.0045 | 0.0026 | 0.0014 |
| 4 | Slot | 320 | 0.146 | 0.146 | 0.117 | 0.081 | 0.052 | 0.031 | 0.018 | 0.0102 | 0.0057 |
| 4 | Length | 80 | 0.586 | 0.586 | 0.469 | 0.326 | 0.207 | 0.124 | 0.072 | 0.041 | 0.023 |
| 6 | (ns) | 20 | 1.875 | 2.009 | 1.705 | 1.234 | 0.804 | 0.490 | 0.286 | 0.163 | 0.091 |

The integration test was conducted at five sample configurations. The PPM density was at reduced setting to maximize the data transfer performance. The transfer test was conducted using two methods. The first method was the self-test feature of the link layer design that uses data generators to produce a data stream and data monitors at the far end that automatically confirm the transfer of data across the link. This performance is displayed in the DGM column in Table 3. The second method utilized an external servers to transfer files across the link using TCP/IP. This performance includes all of the overhead of the protocol layer and represents the performance expected in normal operation.

TABLE 3

| | | | | | Measured Server to Server Data Transfer Rates | | | | | |
|---|---|---|---|---|---|---|---|---|---|---|
| Time Slot ns | PPM # | Guards # | Lost Blocks # | Rcv Block # | Ratio L/R Ratio | Opt Power uW | DGM Mbps | File Size Mbytes | Transfer Time sec | Transfer Rate Mbps |
| 10 | 5 | 20 | 1 | 47585 | 2.1E−05 | 12.14 | 1.865 | 10 | 48.182 | 1.741025 |
| 20 | 3 | 8 | 1 | 49978 | 2E−05 | 22.9 | 1.793 | 10 | 49.977 | 1.678494 |
| 80 | 3 | 3 | 1 | 42430 | 2.36E−05 | 27.9 | 0.628 | 3 | 43.266 | 0.581654 |
| 320 | 3 | 3 | 14 | 5450 | 0.002569 | 27.4 | 0.161 | 1 | 57.647 | 0.145517 |
| 1280 | 3 | 3 | 0 | 1276 | 0 | 27.2 | 0.0414 | 0.3 | 70.06 | 0.03592 |

Figure 17:
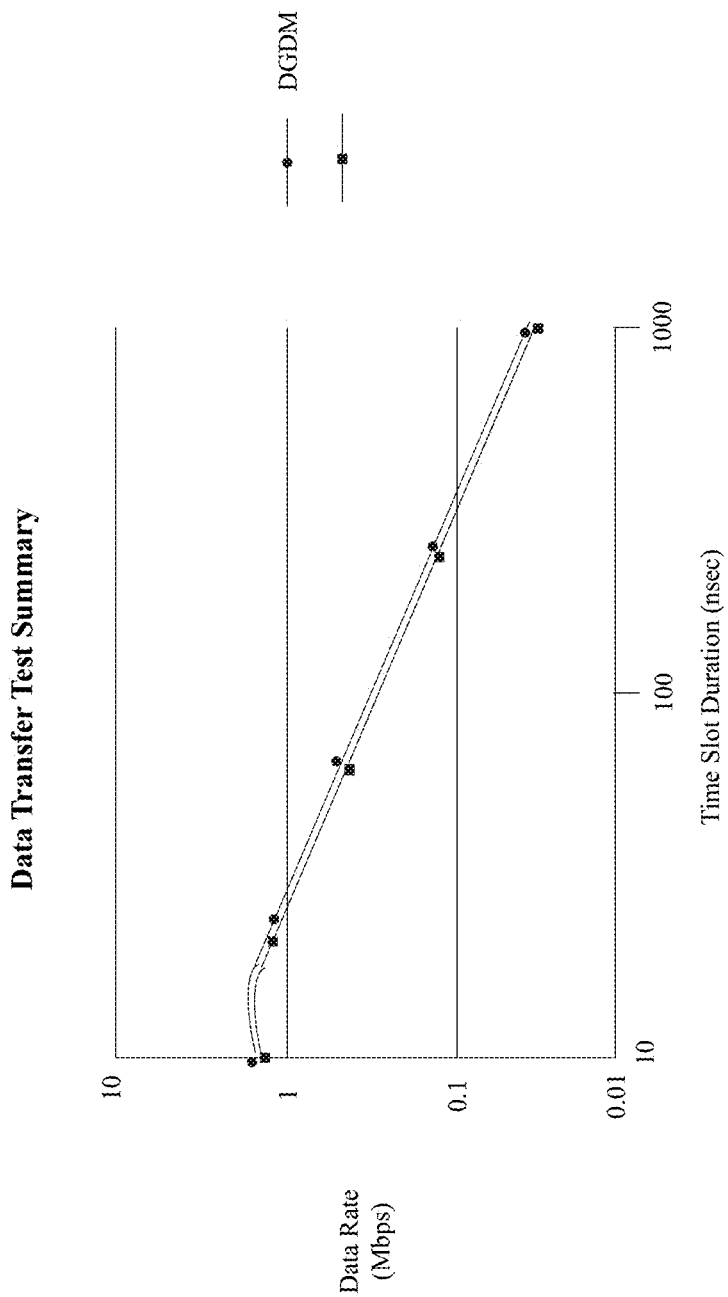
FIG. 17 is an exemplary data transfer test summary plot in accordance with one or more embodiments described herein.

There are two points to note from review of the data. The first is that the self-test DGM method of evaluating the link provides a good estimate of the performance of transferring files from one server to another. This is important because the bulk of the other link layer tests are performed under the DGM test configuration. The second point is that the link data rate acceleration was not significant from time slot decrease of 20 ns down to 10 ns. This is because the physical layer is data rate limited by the transmitter LED response time. Shorter time slots can be used to encode the information, but the link has to be reconfigured with additional guard slots and this extra symbol time defeats the faster signaling rate of the data. The plot in FIG. 17 shows the comparison between the two test methods and the improved data transfer rate with shorter time slot time up to the 20 ns limitation of the physical layer hardware.

Figure 18:
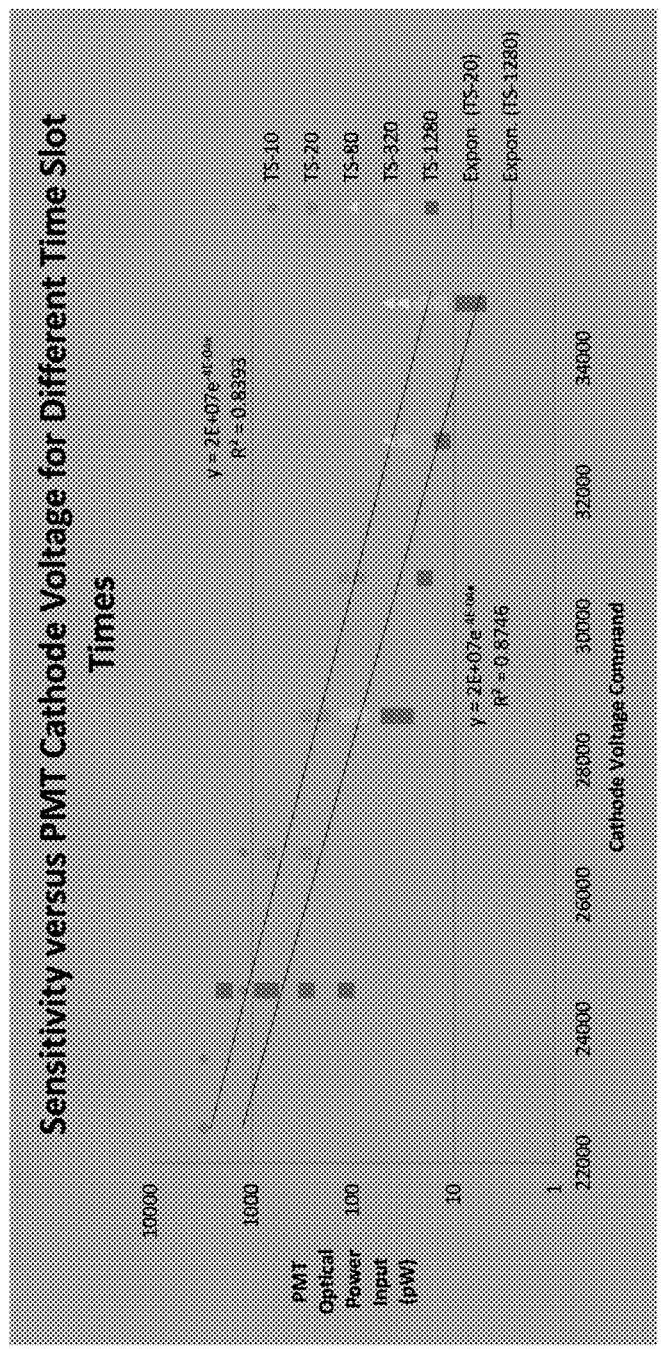
FIG. 18 illustrates sensitivity versus cathode voltage for multiple link layer configurations in accordance with one or more embodiments described herein.

The system sensitivity was tested by reducing the power of the optical input signal into the PMT and increasing the gain of the PMT to maintain communication through the communication link. A lost block ratio less than 10% was used to determine if the link quality would still support the delivery of data. The optical communication link was tested at four time slot times using PPM4. The overall trend as shown in FIG. 18 was an improvement of system sensitivity with higher PMT gain settings and improved sensitivity with slower signaling rates. Two trend lines are shown for the fast and slow data rates for time slot durations of 20 ns and 1280 ns. The trend lines highlight the exponential gain characteristics of the PMT and the improve ability of the communication link to recover lower powered signals with the slower data rate.

For each of the sensitivity tests there was a power setting where the signal was lost. The data rate of the lowest input power that supported communication is shown in Table 4. Table 4 shows the lowest input power that supported communications for each time slot length and the data rate recorded for these conditions. Optical power shown in this table is converted to the amplitude of the pulse peak power.

TABLE 4

Measured Sensitivity versus Data Rate

| Time Slot | Opt Pwr | Data Rate |
|---|---|---|
| ns | nW | Mbps |
| 10 | 19.47 | 1.79 |
| 20 | 1.37 | 0.426 |
| 80 | 0.52 | 0.208 |
| 320 | 0.21 | 0.037 |
| 1280 | 0.09 | 0.009 |

Figure 19:
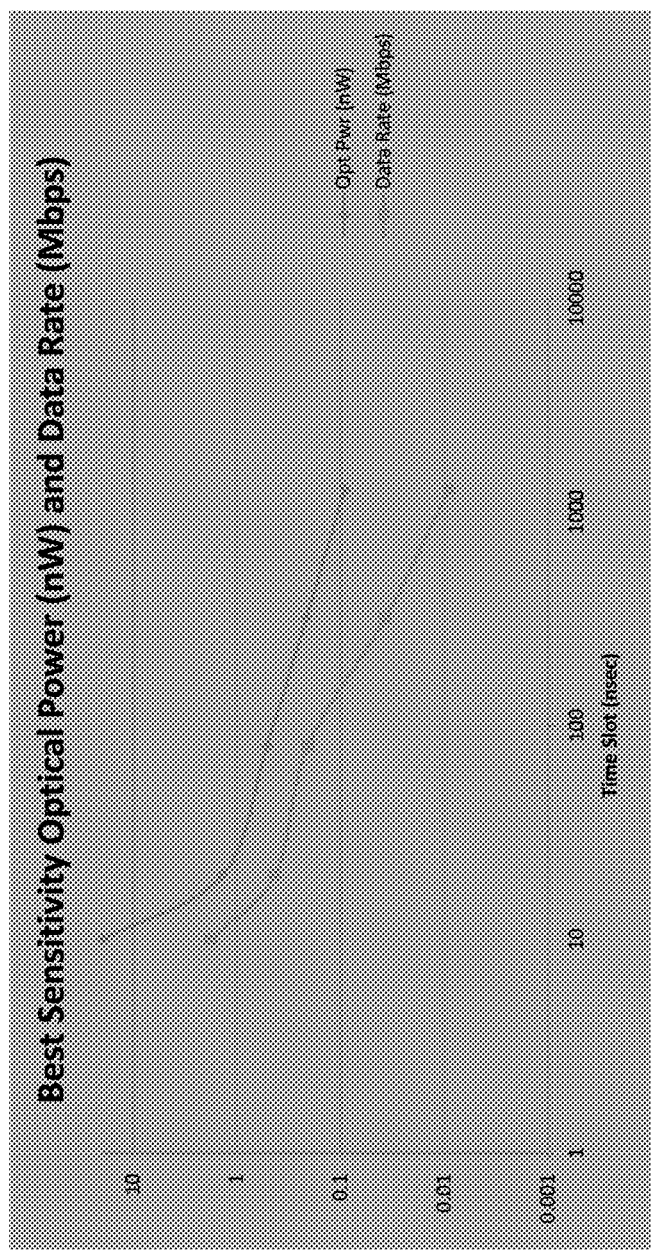
FIG. 19 is a summary of optical sensitivity and data rate versus link layer configurations in accordance with one or more embodiments described herein.

The trend of this sensitivity data is shown in FIG. 19. The combined trend of better sensitivity with lower data rate is shown as the time slot duration increases. This trend supports the adaptive strategy of supporting early link acquisition using long time slot times and then adapting the link to higher data rates as the received signal power increases with the decrease in link range.

Figure 20:
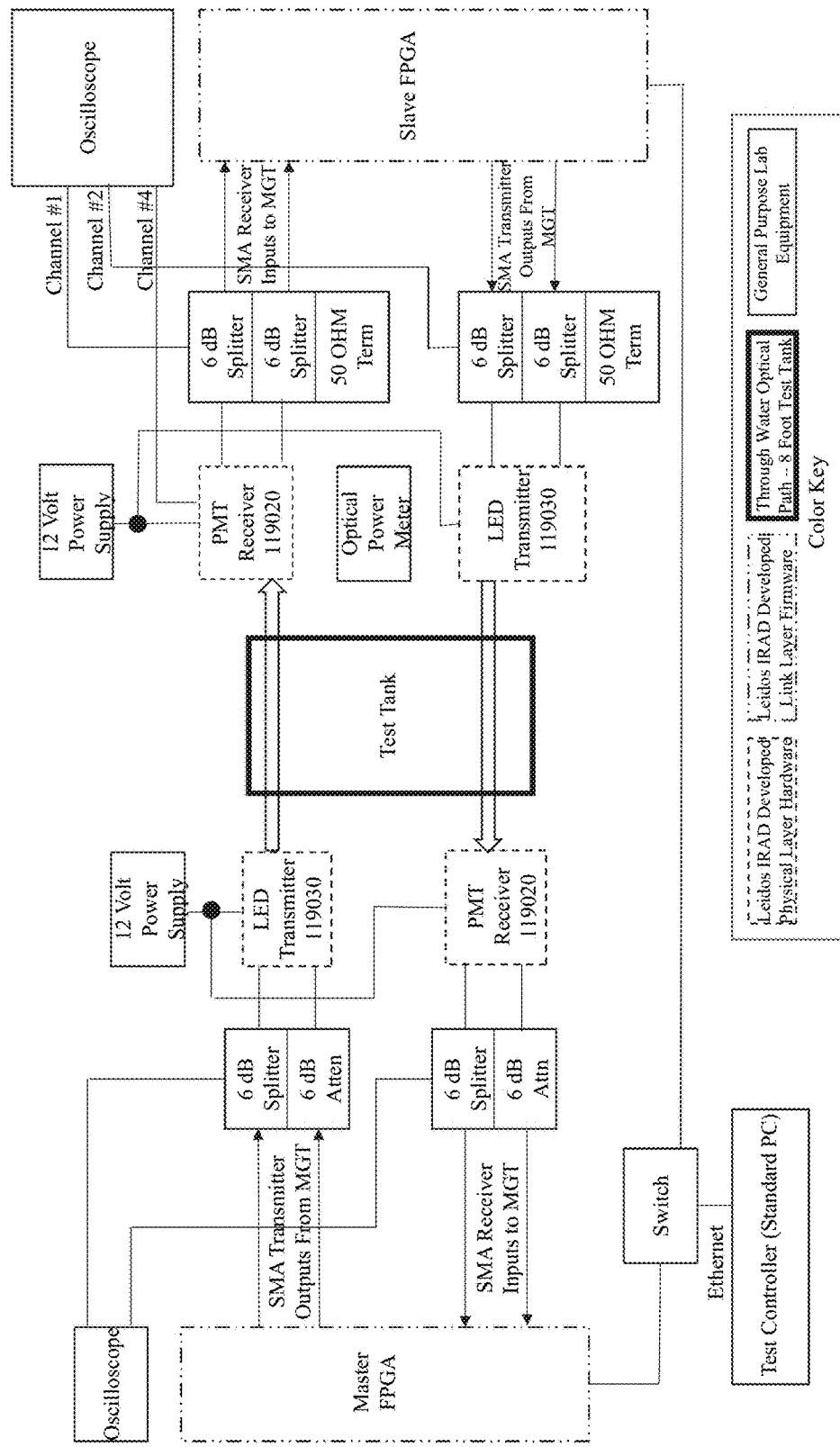
FIG. 20 is a bidirectional optical communication test configuration block diagram in accordance with one or more embodiments described herein.

A bidirectional optical communication demonstration was performed with both the forward and the back channels across the optical links and through a water tank. A summary of the results is shown in Table 5a and Table 5b. FIG. 20 provides a block diagram of the test configuration.

The demonstration successfully sent data in both directions in half duplex operation at bi-directional data rates up to 1.7 Mbps.

TABLE 5a

Measure Bi-directional Optical Communication Test

| | | | | Slave RX stats | | | |
|---|---|---|---|---|---|---|---|
| Time Slot | PPM | RS Blocks | Vit BER ratio | RS BER ratio | UCBs Count | UCB/RXB ratio | Data rate Mbps |
| Medium Speed PPM 4 | | | | | | | |
| 80 | 4 | 32 | 1.0E−05 | 0 | 0 | 0 | 0.554 |
| Fast Speed PPM 5 | | | | | | | |
| 20 | 5 | 32 | 5.0E−04 | 0 | 1 | 2.2E−05 | 1.063 |
| Fast Speed PPM 4 | | | | | | | |
| 20 | 4 | 64 | 1.0E−04 | 0 | 1 | 2.1E−05 | 1.711 |

TABLE 5b

| | | | | Master RX stats | | | |
|---|---|---|---|---|---|---|---|
| Time Slot | PPM | RS Blocks | Vit BER ratio | RS BER ratio | UCBs Count | UCB/RXB ratio | Data rate Mbps |
| Medium Speed PPM 4 | | | | | | | |
| 80 | 4 | 32 | 1.0E−02 | 1.0E−06 | 21 | 4.9E−04 | 0.554 |
| Fast Speed PPM 5 | | | | | | | |
| 20 | 5 | 32 | 4.0E−04 | 0 | 0 | 0 | 1.063 |
| Fast Speed PPM 4 | | | | | | | |
| 20 | 4 | 64 | 5.0E−03 | 0 | 0 | 0 | 1.711 |

Timing recovery was not implemented for the through water demonstration tests. This limited the burst to the match of the clock in the master link layer to the clock the slave link layer.

The following information provides additional descriptive support for the APPM embodiments described and tested herein, including an APPM radiometric analysis.

Figure 21:
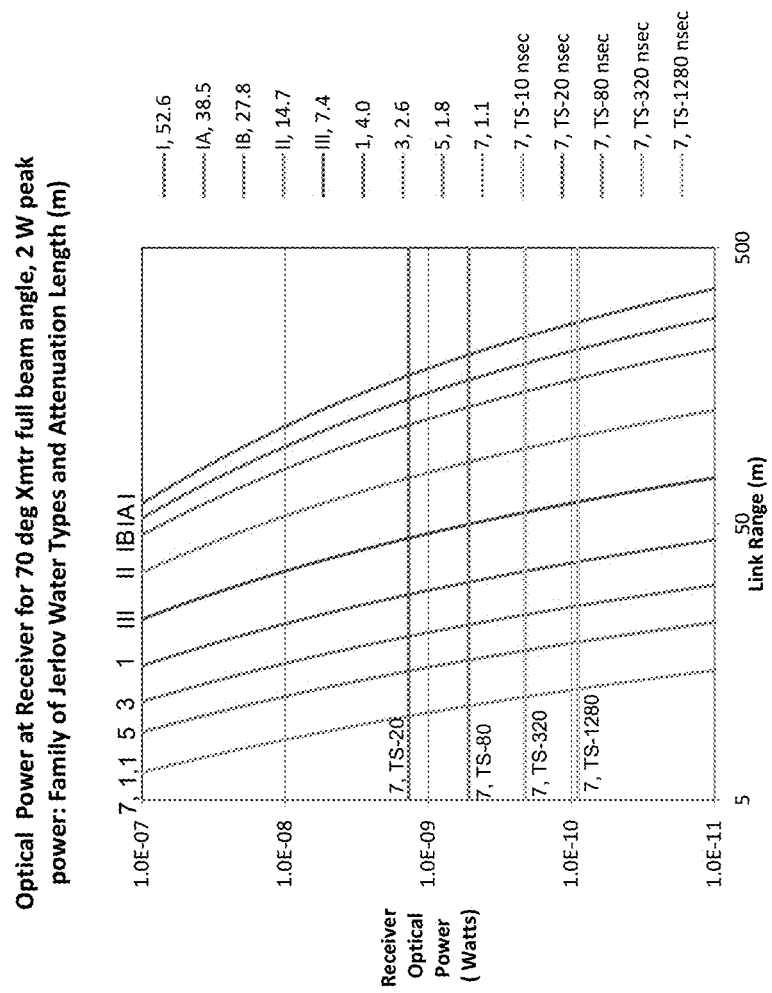
FIG. 21 is a link margin receiver power plot in accordance with one or more embodiments described herein.
Figure 22:
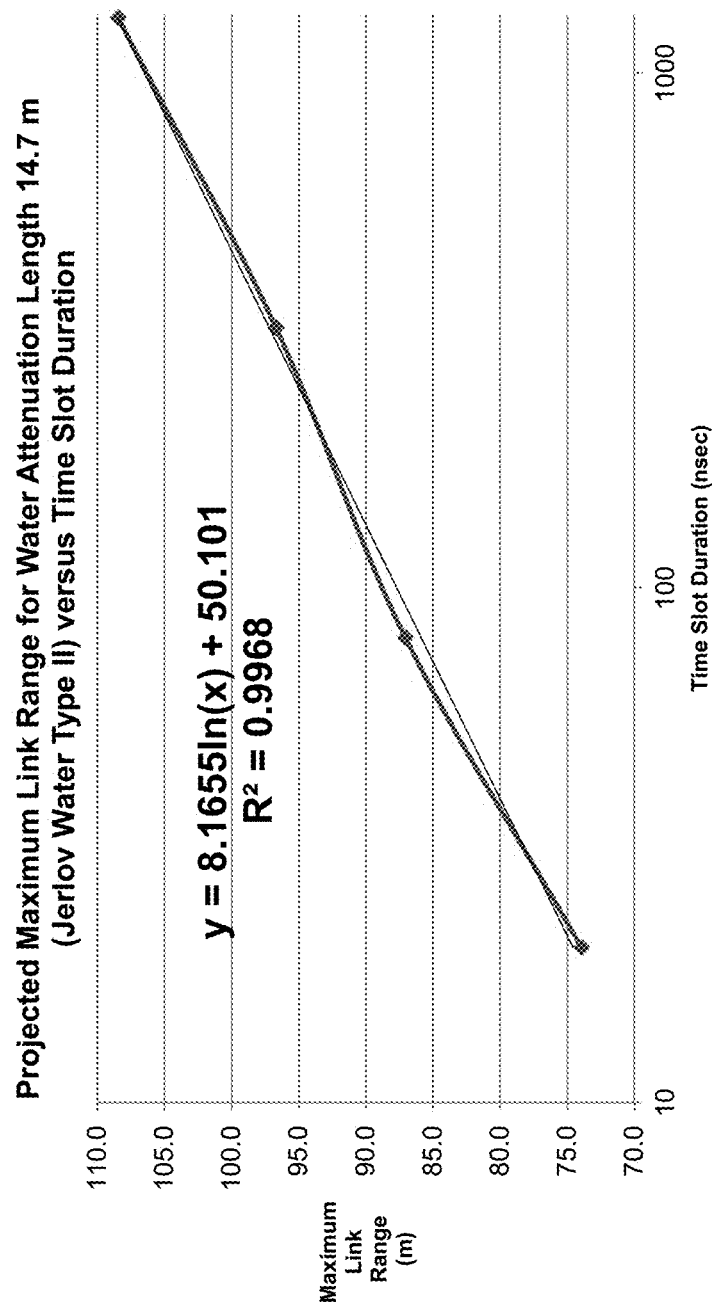
FIG. 22 projects maximum link range versus link layer configuration in accordance with one or more embodiments described herein.

Light transmission in ocean water has been measured and conforms closely to an exponential loss of optical energy with transmission distance. A prime variation is the water clarity from one part of the ocean to another. Several studies have been made to characterize the attenuation coefficient of ocean water. These studies show a spectral dependence of the attenuation coefficient with a better transmission in blue wavelengths for mid-ocean conditions and a shift in the transmission to blue-green for coastal waters. The model shown in FIG. 21 is based on prior art Jerlov measurements. Jerlov characterized the clearest ocean waters as type I and poor ocean water transmission as type III. Jerlov also provided measurements of coastal water transmission with the clearest as type 1 down to the poorest as type 9.

The families of curved lines show the drop in receiver power for a particular Jerlov water type. The straight lines across the plot are the sensitivity number from the integrated system testing performed using fast to slow signaling rates (time slot durations of: 10, 20, 80, 320 and, 1280 ns). The intersection between the receiver power and the receiver sensitivity is the maximum range of operation for that condition.

The knowledge of the attenuation coefficient of the water with a basic model of beam geometry can be used to estimate the optical power at a distant detector based on the knowledge of the power at the source, the beam divergence angle and the absorption coefficient of the water. With knowledge of the minimum light signal power that can be recovered by a receiver, a maximum link range can be calculated. This is the range where the power at the receiver equals the minimum power required to recover the signal. Table 6 is a plot of the power at a receiver based on the distance to the source and the attenuation coefficient of the water with the beam characteristics of the APPM system. The table top row indicates the Jerlov water type classification number, the second row is the attenuation length in meters for that Jerlov water type for the 450 nm spectral source used in the APPM. The remaining rows show the maximum range based upon the sensitivity of the signals at the different rates measured in the APPM system tests.

The overall range of optical attenuation control was from 4.0 to 10.0 OD. Optical input power into the PMT supported a range of 5 uW of optical energy down to 50 pW.

The first embodiment discussed in detail above with respect to FIG. 1b through FIG. 22 and Tables 1 to 6 for an APPM system, including results of various testing of said APPM system for bi-directional underwater optical communications, is not so limited. Further to FIG. 1a and the description below, the APPM system may be implemented as part of an optical communication system, uni or bi-directional, that spans the AWI. The system may be asymmetrical in design. Additionally, as discussed further below, the APPM system is able to dynamically and automatically adapt to recover signals over a wide range of input optical power caused by large variations in signal attenuation from scattering and absorption. This provides an optical communication link for under-water applications and AWI applications that will work over a wide variation in link range and medium conditions. Such adaptability includes utilization of automatic gain control (AGC).

A summary of the gain control features supporting adaptability is provided herein. The signal amplifier on the receiver supports 20 dB of automatic gain control for recovery of the pulsed signal. An additional 30 dB of dynamic range is available by correctly adjusting the gain of the PMT with selection of the cathode voltage. The autonomous adaptability system includes a control loop for initialization of the receiver settings for startup with no signal present. The APPM platform supports detection of a remote signal and the measurement of the signal strength by the PMT receiver. This information will be automatically converted into a calculation of the best cathode voltage gain setting to allow the automatic realization of the full dynamic range of the receiver. The link layer supports the detection of signal quality. An application protocol between the master and slave allows the master to understand the joint operation of the communication link and reconfigures both sides of the link to faster data rates when supported by the environment.

Figure 23:
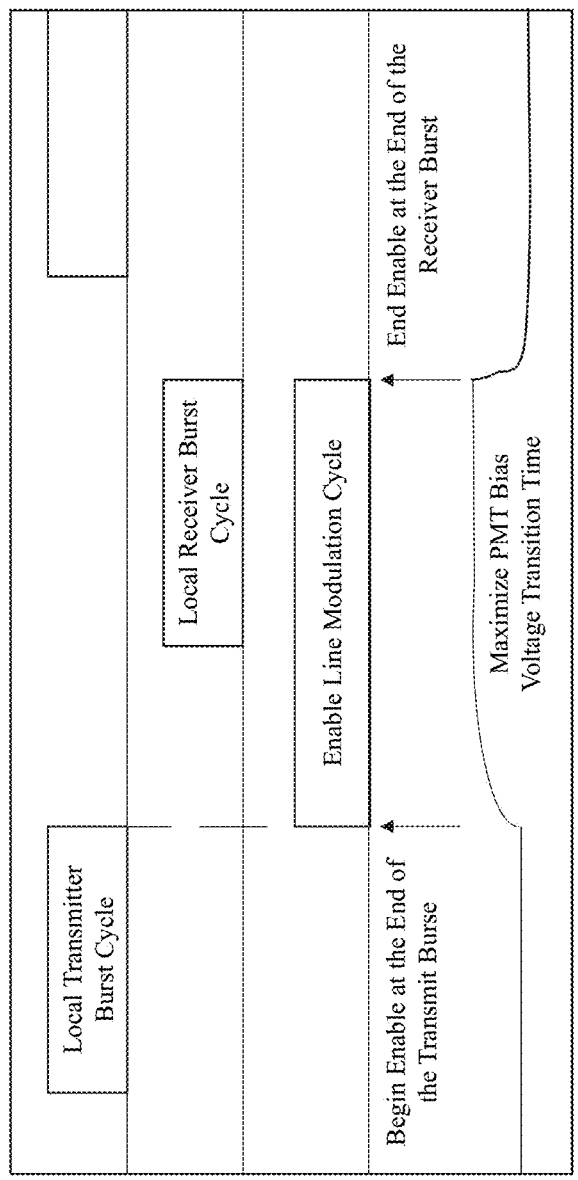
FIG. 23 is a schematic showing the dynamic receiver gain modulation concept in accordance with one or more embodiments described herein.

FIG. 3 illustrates the operational components of the receiver. Specifically, with respect to the receiver gain control, implementation requires the receiver to rapidly modulate the PMT gain to a low value during the operation of the local transmitter and then shift the gain to a high value to sense the signal from the remote transmitter. Referring to FIG. 23, the link layer provides an enable signal to the receiver that turns on the receiver PMT bias voltage as soon as the local transmission burst is complete. The enable signal to the PMT bias voltage is then removed at the end of the

TABLE 6

Maximum Link Range Calculation for Demonstration Physical Layer (meters)

| Jerlov 450 nm Water Type | I | IA | IB | II | III | 1 | 3 | 5 | 7 |
|---|---|---|---|---|---|---|---|---|---|
| Water Attenuation Length (m) | 52.6 | 38.5 | 27.8 | 14.7 | 7.4 | 4.0 | 2.6 | 1.8 | 1.1 |
| Time Slot 10 ns - 19,000 pW | 97.9 | 84.3 | 70.3 | 48.1 | 31.0 | 20.5 | 14.8 | 11.5 | 7.8 |
| Time Slot 20 ns - 1,370 pW | 174.7 | 141.7 | 114.3 | 73.9 | 45.6 | 28.9 | 20.2 | 15.0 | 10.5 |
| Time Slot 80 ns - 520 pW | 211.7 | 171.1 | 136.8 | 87.1 | 52.4 | 32.0 | 22.8 | 17.0 | 11.7 |
| Time Slot 320 ns - 210 pW | 246.9 | 198.6 | 157.0 | 96.7 | 56.9 | 35.6 | 23.7 | 18.4 | 12.1 |
| Time Slot 1280 ns - 90 pW | 273.5 | 218.4 | 173.2 | 108.5 | 62.5 | 37.0 | 26.9 | 19.0 | 13.3 |

A plot of standard open ocean water conditions, Jerlov type II water (attenuation length 14.7 m) is provided below. One important feature to note from this chart is the exponential reduction in signaling rate to achieve a linear improvement in link range. This characteristic is the central motivation for an APPM system. The system supports long range signal capture and operation as well as improving the data rate as the range decreases and more power is available at the receiver.

burst from the remote transmitter. The link layer also inserts dead periods between the local burst and the remote burst to allow the PMT bias voltage to settle to values needed for the next burst phase. An additional feature synchronizes the collection of the monitor information from the receiver to the remote burst period. Synchronization is needed because the receiver monitor has dramatically different readings during the remote transmitter burst and the local transmitter burst and the AGC must be able to control the gain based on the monitor conditions during the remote transmitter burst.

With the APPM half-duplex system, the received signal strength sampling ADCs are synchronized with the state of the local receiver. When the local transmitter is operating, it is expected that the local ADCs will likely be affected by near end reflections. In the current system, a software-based SPI master is used to control the ADC sampling. The software-based SPI master is able to sample all eight ADC channels in around 380 to 440 us. Synchronizing the software-based SPI master to the local variable symbol rate of the link in only successful at the slowest symbol rates. For higher symbol rates, in a second implementation, a hardware-based SPI master would be designed that automatically reads out the ADC channels and populates two different register banks with the ADCs values at very high rates.

The hardware-based SPI module continually reads out the ADC channels and writes the results into the appropriate register that matches the current endpoint mode (RX or TX). At each transition between RX and TX, the ADC channel address is reset to zero. To account for the fact that other SPI devices may exist on the single bus and need to be occasionally accessed, at the beginning of each mode transition, a single SPI transaction is allowed for one of the extra SPI devices on the bus. The application or driver layer (software) ensures only one extra device makes a request at a time. In an alternative configuration, separate SPI buses may be used for the real-time channels (hardware) and for non-real-time channels (software).

Two sets of ADC registers exist in the design for both TX and RX. The first set is the latest value from each of the eight channels. The second set is the last snapshot taken from all channels. The snapshot is triggered with a write to the specific snapshot register. The snapshot version of the ADC channels is important when trying to sample multiple channels closely together. If only relying on only the latest register bank, two channels values could be from separate bursts.

A key to automatic adaptability of the optical communications system requires a receiver with gain control that is able to increase the signal gain when the signal is low and reduce the gain to protect the receiver when the optical signal is high. The type of receiver selected for the embodiments described herein, a PMT receiver, was selected because PMTs offer both high sensitivity and a large range of gain control. Characterization data indicated that the AC signal strength was a good indicator of the Viterbi BER and would be a good parameter to use for the AGC loop monitor variable. The data also showed that the gain relationship between the PMT cathode voltage and the signal strength was not constant. However, the nonlinear performance of the gain control has some implications on the stability and settling time of a control loop. With the receiver gain variation, a normal linear gain control loop would either be extremely overdamped for feedback control when the gain is low or unstable with a large overshoot and oscillation when the system was working in the higher gain region. Accordingly, the APPM system implements two control loop compensations, control loop gain mediation with increasing command and mediation of the target output signal stringy. The AGC is implemented as a linear compensation for the control loop gain, and the linear compensation of the target value for the signal strength. That is, the gain control loop uses an increasing control loop gain as the collector voltage is increased.

Implementation of the AGC uses an AGC application program executed on a control server in the receiving transceiver and updates the PMT gain command to the receiver through remote procedure calls. The control loop reads the present signal strength, anode current and the link status. If the link is present, the program calculates the best target value for the signal strength based on the present gain control command, calculates the difference between the actual measured signal strength and the target value and uses that difference to calculate a new PMT gain control command. If no link is present, the signal strength monitor is not synchronized with the remote transmitter and cannot provide meaningful measures of the signal strength. When no link is present the AGC control loop uses the anode current monitor and steps up the gain until a target anode current value is exceeded. This puts the system in a gain range that will support signal and link acquisition. If there is no actual optical APPM signal then there will be no link acquisition and the AGC will continue to seek the best gain based on the anode current measurement and step the gain up or down by fixed step sizes to maintain the anode current target value.

When the link is present the signal strength target value is calculated by the AGC application program based on the present gain command; thus inferring the probable optical signal strength. The following equation is used to calculate the target value:

$$\text{SigStrTarget} = 1800 + \text{Command} * (-0.25)$$

Figure 24:
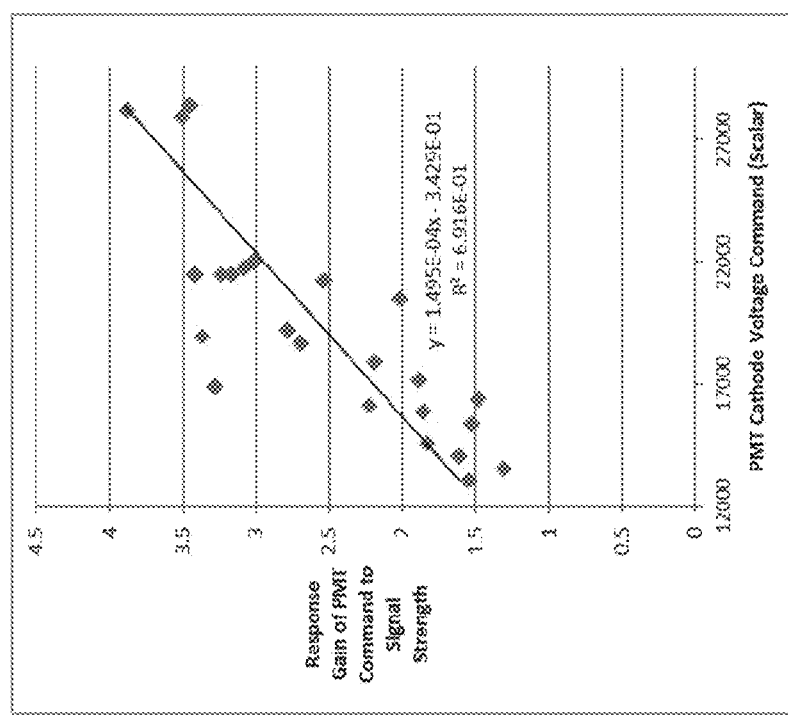
FIG. 24 graphs control loop gain dependence on the cathode PMT bias voltage command in accordance with one or more embodiments described herein.

FIG. 24 shows the scatter plot of the gain based on the present PMT bias voltage command. The higher gain at higher bias command voltages is needed to quickly drive the gain in response to changes in the optical signal power. The graph includes the gain compensation equation that is used in the AGC loop.

Figure 25:
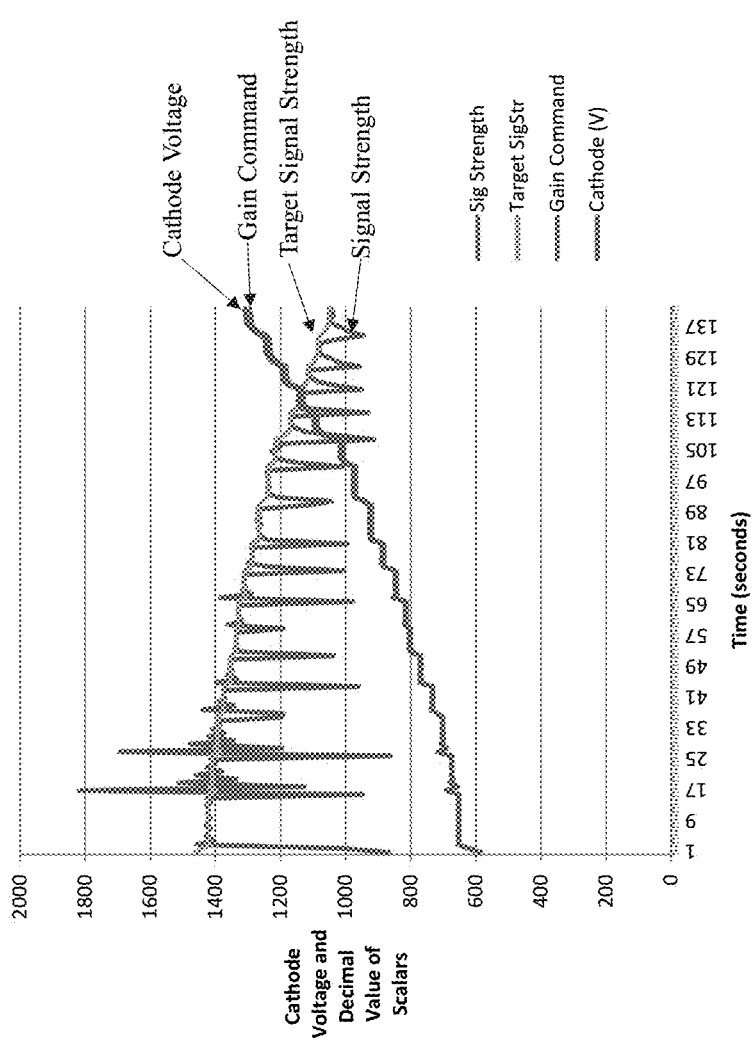
FIG. 25 graphs automatic gain control (AGC) response to optical attenuation of the receiver input signal in accordance with one or more embodiments described herein.

FIG. 25 shows exemplary AGC response to an optical signal as it was attenuated. When the optical signal is stepped down, the signal strength dips. The AGC loop responds by increasing the cathode voltage to increase the gain of the PMT receiver. The target signal strength is reset for each new light condition and the AGC loop quickly settles to the intended signal strength target value. The test sequence showed the link to maintain good BER communication over an optical power range of 33 dB. It is advantageous to note that electrical gain was set at a single value for this testing.

Figure 26:
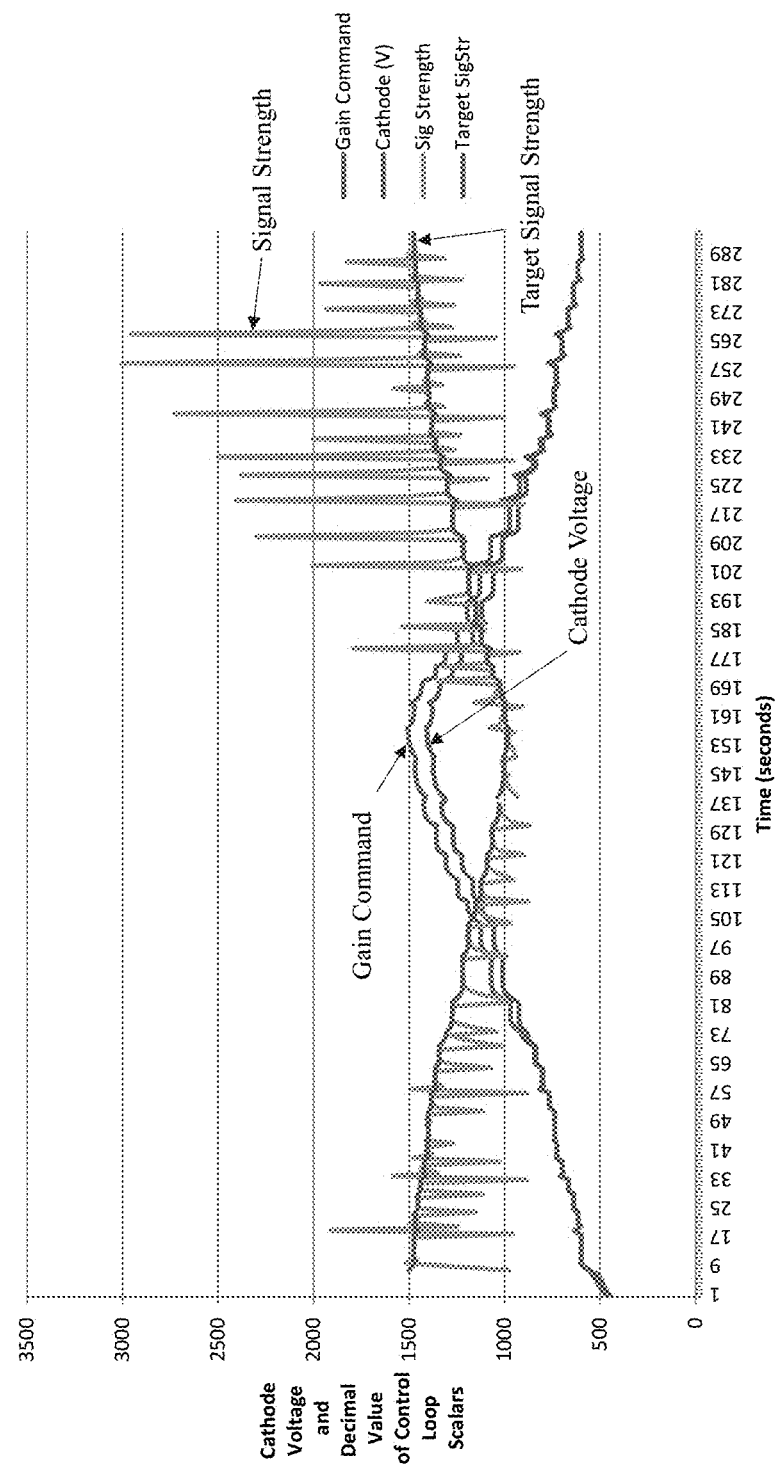
FIG. 26 graphs AGC response to signal strength in accordance with one or more embodiments described herein.

FIG. 26 shows a full sequence of adding optical attenuation to bring the optical power to the minimum level that could be detected, followed by a sequence of decreasing the optical attenuation to simulate varying link ranges and/or changing medium is shown to illustrate AGC response. The cathode voltage ramps up to increase the gain in response to the declining optical signal and the then backs off as the optical signal strength increases. The link is maintained at low BER conditions throughout the sequence. The transients on the signal strength monitor occur at each step transition of the optical signal strength. The important observation is the rapid convergence of the signal strength to the target value.

Turning to the issue of data transmission rate, the basic theory of the PPM data transmission rate is that the noise in the signal is primarily indicated by the jitter in the received signal. This noise has multiple components; some of the noise is related to the transmission media and includes multipath temporal degradation of the optical arrival time of the signal. Other noise components are related to the limits of the transceiver. These include signal trigger jitter at the transmitter and the white noise of the receiver electronics. Another noise source that influences the receiver is the dark noise of the PMT. It has been observed that independent of the source of the noise, the link transmission is limited by the observed jitter of the received signal. The observation for the APPM link layer electronics is that link error rate climbs rapidly as the jitter increases past 40% of the length of the time slot. With this predictor, the APPM system has a means to assess the link performance to determine if signaling rate should be reduced to maintain reliable communication or can be increased to support faster data rates. Based on this assessment, the link layer logic can configure the length of the time of slot, providing a method to reduce the jitter to time slot ratio and improve the link reliability, or if the jitter is low, the link data rate can be increased with a shorter time slot configuration.

Accordingly, the APPM system provides for measurement of the arrival time of the data pulse and is able to infer the jitter of the received signal. The time slot is subdivided into five sample intervals; each pulse arrival is recorded into which sample position the pulse is decoded. At the end of a monitor sequence this list of 5 values represents a histogram pulse arrival time relative to the time slot boundary. The histogram is then processed by a direct statistical algorithm to determine the average and standard deviation of the pulse arrival time. The jitter is inferred from the standard deviation of the histogram data.

Figures 27A, 27B:
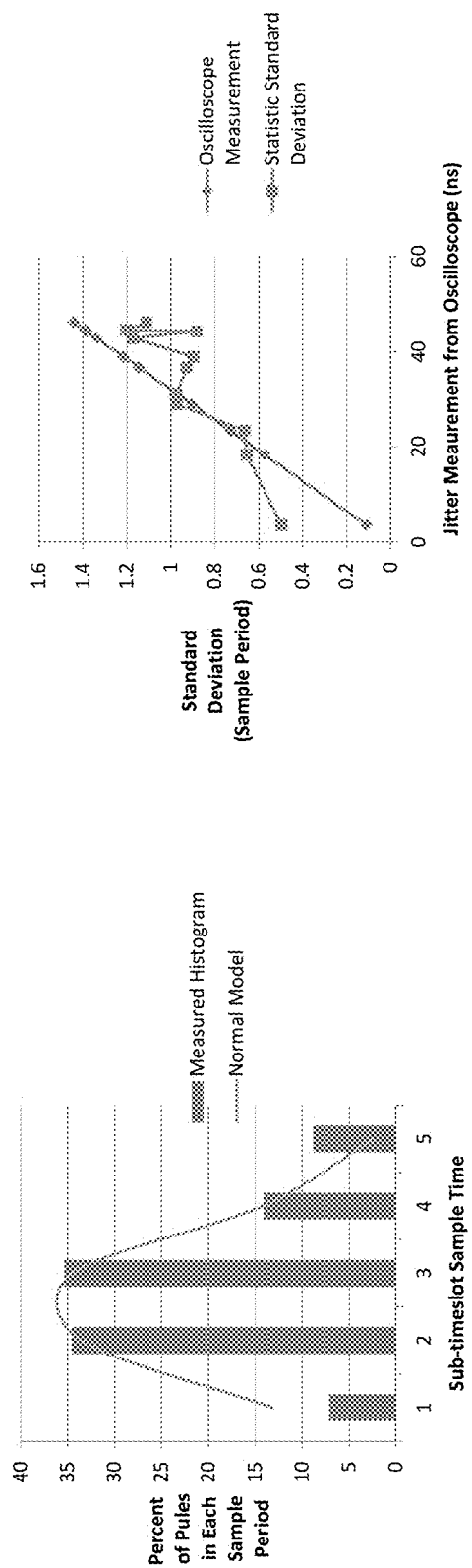
FIGS. 27a and 27b graph the percent of pulses that arrived in each sample period and jitter measurements comparisons (oscilloscope measurement vs. sample period standard deviation calculation) in accordance with one or more embodiments described herein.

An example histogram of the sample time arrival is shown in FIG. 27a. The bars represent the percent of pulses that arrived in each of the 5 sample intervals. The values in the example shown were: 7%, 34%, 35%, 14% and 9%. The standard deviation of the histogram statistic is 1.05 sample periods. The jitter was also independently measured by an oscilloscope for reference and was 44 ns of a 80 ns time slot. The jitter inferred from the standard deviation calculation is 33 ns. Expanding the example to evaluate the link under different link conditions, jitter was measured with an external oscilloscope as well as with sample period standard deviation statistic method described above. FIG. 27b shows a scatter plot of these two measurements across varying link conditions. This strong correlation allows for the use of the sample period standard deviation statistic method to be used to predict the performance of a link at a faster or slower time slot signal rate.

Implementation of this automatic APPM is achieved through an APPM application program executed on the master link layer electronics, which may be integrated with the AGC application program or executed as a separate program. Once a link is initialized, the APPM application program monitors the performance of the link for predetermined length intervals, e.g., 5 seconds, and uses the measured data to determine if the link should be reconfigured to slow down or speed up link. Simultaneously, while the link is running the AGC loop maintains the PMT gain in the receiver as discussed above. The link BER is monitored and the value is used to determine if convolutional forward error correction should be enabled or not for the next interval. The monitored pulse sample statistics are used to infer the channel jitter. If the inferred jitter is high, the APPM application program instructs the both the master and slave link layer electronics to slow the link down to improve channel performance. If the inferred jitter is low, the APPM application program instructs the both the master and slave link layer electronics to speed up the channel to improve the data transmission rate. Burst length increases as the encoding rate is increased. The longer burst length improves the effective data rate because a smaller part of the channel operation is spent in the pilot sequence acquisition and in waiting for the receiver gain to recover. Using shorter bursts when the link is set to lower data rates was found to be more stable and able to maintain a link at low light levels.

Figure 28:
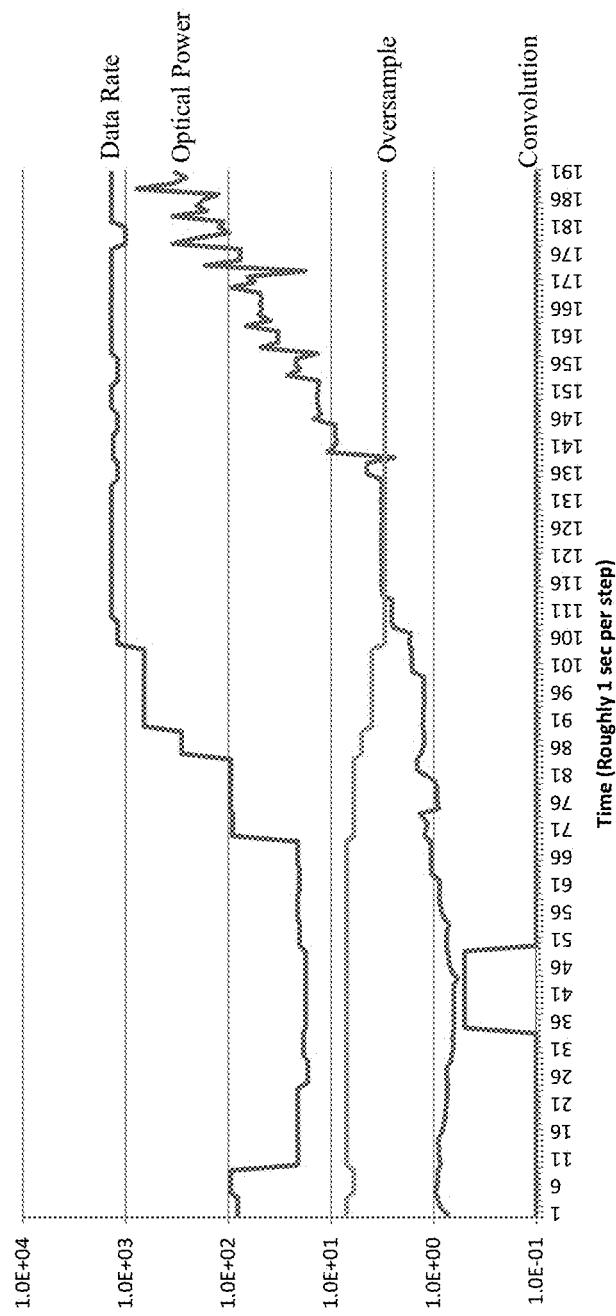
FIG. 28 graphs variable link characteristics of optical power and data rate in accordance with one or more embodiments described herein.

Further, at low optical power into the receiver, the link jitter is large and the APPM application program instructs the both the master and slave link layer electronics to select a lower encoding rate to maintain data transmission. At high optical power into the receiver, the jitter is low and the APPM application program instructs the both the master and the slave link layer electronics to increase the data rate. FIG. 28 shows the link characteristic as the optical power is brought up to first acquire the link, then reduced to the lowest optical energy at which the link can be maintained, and finally the optical power is increased. The APPM application program progressively selects a faster data encoding rate to improve the date rate. From left to right, the trend is seen in the optical power as it first decreases and then increases. The data rate first drops as the link is taken to the edge of viability and then steadily increases as the jitter improves. The Oversample plot is a control to the link layer electronics that specifies the encoding rate; in the plot, the oversample is decreased from 7 in steps down to 3. Each integer step downward doubles the encoding rate. The final plot on the graph, Convolution, shows the region of operation were the APPM application program selected to enhance the forward error correction by using one half convolution encoding. Note that convolution encoding is only selected at the slowest of data encoding rates when the signal has a very low signal to noise ratio. For this particular example, the APPM system operated at input optical power from 0.59 uW to 786 uW. Over this power span the program operated from a data rate of 16 Kbps to 1,386 Kbps. This enabled the optical communications link to operate over a broad range of input signal conditions and have a data rate acceleration of up to 86 times.

While the embodiment described above refers to a half-duplex infrastructure supporting the master-slave half-duplex mode, wherein one transceiver is the master while the other transceiver is the slave, the embodiments are not so limited. In a continuous burst mode of operation, the transceivers communicate in a full duplex mode, wherein both transceivers are capable of transmitting and receiving simultaneously using separate communication channels.

Each transmitter runs a continuous loop of {pilot, burst, and pause}. Each receiver runs a fixed length receive loop continuously {pilot search, burst}. The initial receiver loop is an open-ended pilot search until the first match. When no pilot is found, the receiver will continue to search for pilot sequences as well as count missed pilots as each burst period expires.

With full duplex systems the frequency difference between the two ends of the link limits the maximum rate at which data may be transmitted. Each transmitter must assume the worst case—it is faster by the maximum allowed frequency difference and insert pauses to allow the assumed slower receiver to catch up. This pausing at the transmitter is normally called "clock compensation". In the APPM link, each receiver has a FIFO sized appropriately to cover one burst's worth of accumulated overrate half samples. Therefore, the APPM transmitter must pause one symbol for each ten thousand symbols in the burst. In some cases the pilot sequence will be a large enough pause that no explicit pauses need to be added.

Timing recovery is necessary for many communication protocols. The basic problem is that even a good clock reference will drift due to different rates as a result of temperature and time. The time difference between two reference clocks requires the data receiving device to synchronize the signal decoding to the rate that it is received. Without timing recovery, a data decoding sequence is limited by how long it takes the data to drift out of phase. This timing breaking point is a simple ratio. When the number of timing cycles exceeds the inverse of the clock precision, the data stream will no longer have the correct phase and will be decoded incorrectly. An example is two clocks that are offset by 100 parts per million, the sequence would fail after ten thousand clock cycles.

A PPM system is also burst length limited without timing recovery, the link breaks when the number of timing cycles exceeds the inverse of the clock error. However, PPM has many more timing cycles per data point compared to other encoding methods such as On/Off Keying (OOK). In the example above, there are two clocks with 100 parts per million errors, the breaking point is 10 thousand clock cycles. For a deeply encoded PPM signal like PPM10, this limit is reached within just 10 symbols because there are over a thousand clock cycles per symbol.

Because many systems require a continuous decoding of data, there has been considerable investigation into robust methods to perform receiver clock synchronization and data delivery across two different time bases. The standard phase lock loop methods look at cycle by cycle phase detection and clock rate correction. For a PPM signal there is only one pulse per symbol, this means that the duty cycle, the ratio of signal to no signal can be as low as 0.1% for PPM10. The PPM timing recovery has to be able to detect the phase of the data pulse within the time slot period and then adjust the clock rate to correctly decode the next symbol.

Timing recovery methods have been modeled and simulated as part of the APPM embodiment development. This feature is required to support the expected clock offset between a master and slave link layer hardware in fielded systems. The basic concept is there is a capture of the arrival time of the data pulse relative to the absolute expected time for that time slot. This difference is stored as the phase error of the received signal. The phase error resolution is one fifth of a time slot. This time period is the sample time of the decoding logic. When the phase error is continually positive, the decoder will shift the decode time back one sample period to resynchronize the decode time. When the phase error is continually negative the decoder will shift the decode time forward one sample period to resynchronize the decode time. In addition to adjusting for an immediate phase shift, the timing recovery logic continues to monitor the average timing offset and predict the time needed to maintain time synchronization. This prediction function allows timing recovery to work with a large amount of jitter on the received signal.

Figure 29:
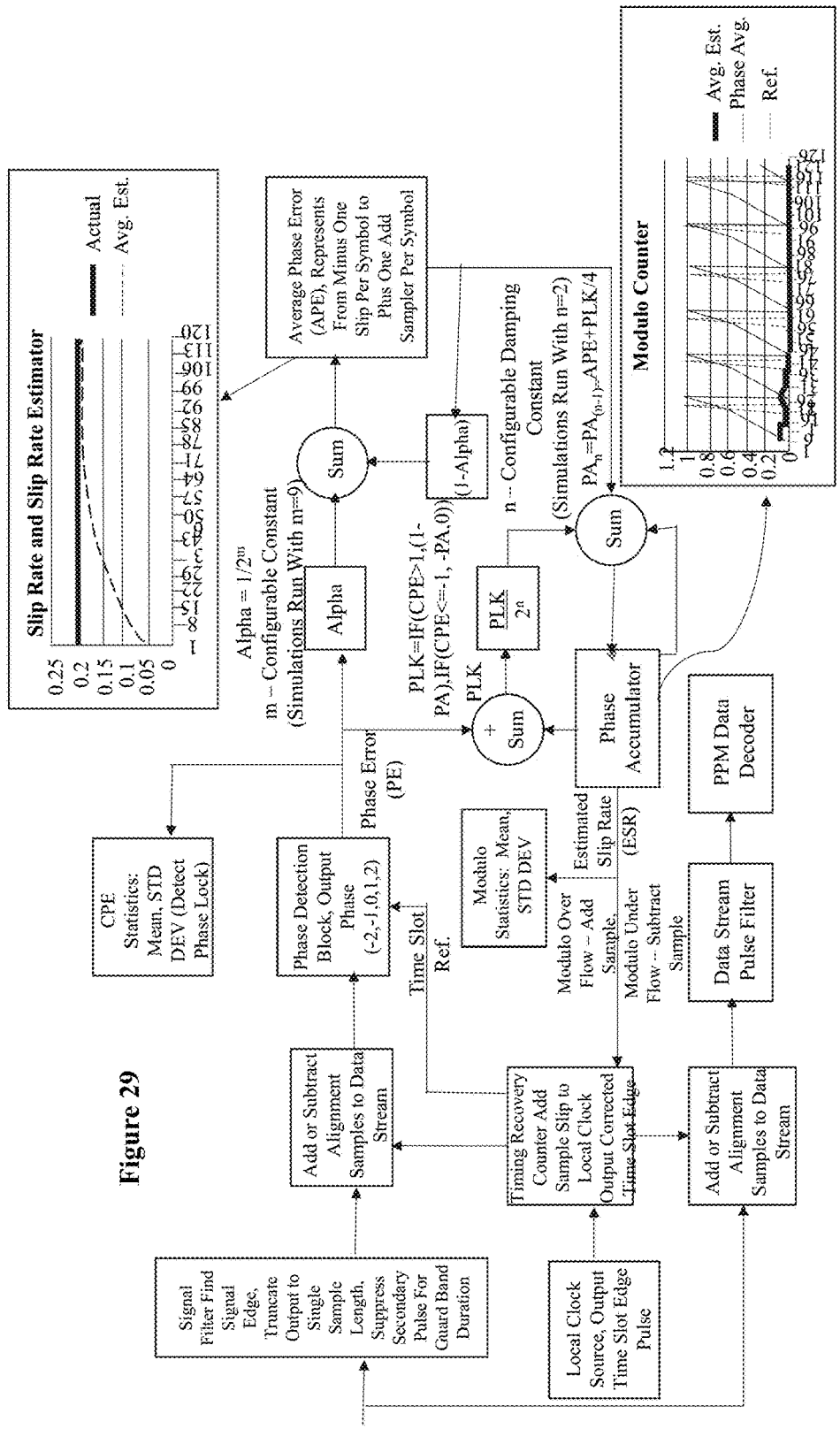
FIG. 29 is an exemplary PPM timing recovery block diagram in accordance with one or more embodiments described herein.

Referring to FIG. 29, the mathematical model for the timing recovery process is described. Two counters are updated with the symbol phase error once per symbol period and based on the results of these counters, a shift in the decode time forward or back is made during the next guard band period. One counter is used to calculate the average phase error. This helps to predict the next phase event. The output of that counter feeds into the phase accumulator counter. This counter represents the ongoing expected point when the phase update is needed. The system needs rapid phase acquisition so there is a forward path for the phase error to directly update the phase accumulator to maintain phase synchronization.

Figure 30:
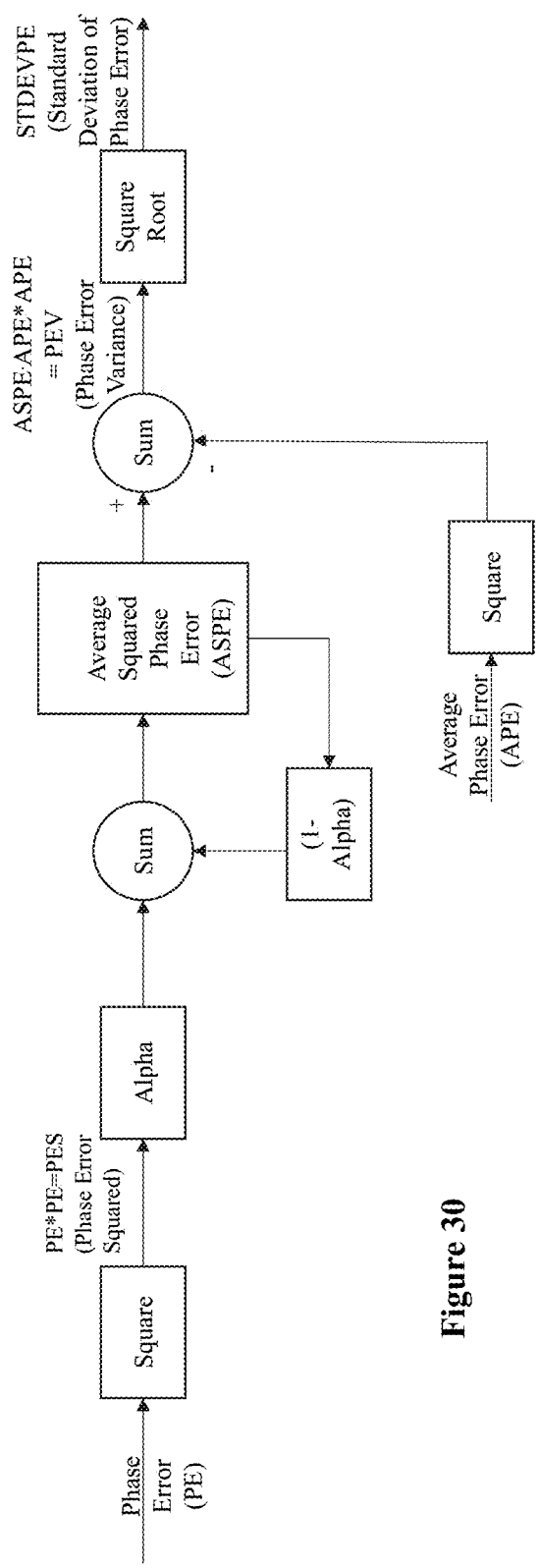
FIG. 30 illustrates an exemplary PPM timing recovery phase error calculation process in accordance with one or more embodiments described herein.

Referring to FIG. 30, in addition to the timing recovery control loop, two additional counters are included in the design. These counters report the clock offset and the variation in the phase error signal. These two values are available to the link control and are used to determine the stability of the link. The output of the phase accumulator indicates that a phase shift is required. This signal is sent to the decode logic to correct the phase. It is also sent to a counter which is averaged over the burst period and the results indicate the average clock offset between the two systems. The second monitor counter takes the squared average of the phase error signal. This signal is averaged to determine the variance of the phase error. This is a parameter proportional to the jitter of the received signal. The two indicators are then used to determine the likelihood that the timing recovery can continue to operate reliably. For highly stable indications, the link layer can increase the data encoding rate. For low stability indications, the link layer can slow down the data encoding rate, this proportionally decreases the signal jitter and improves link stability.

Figure 31:
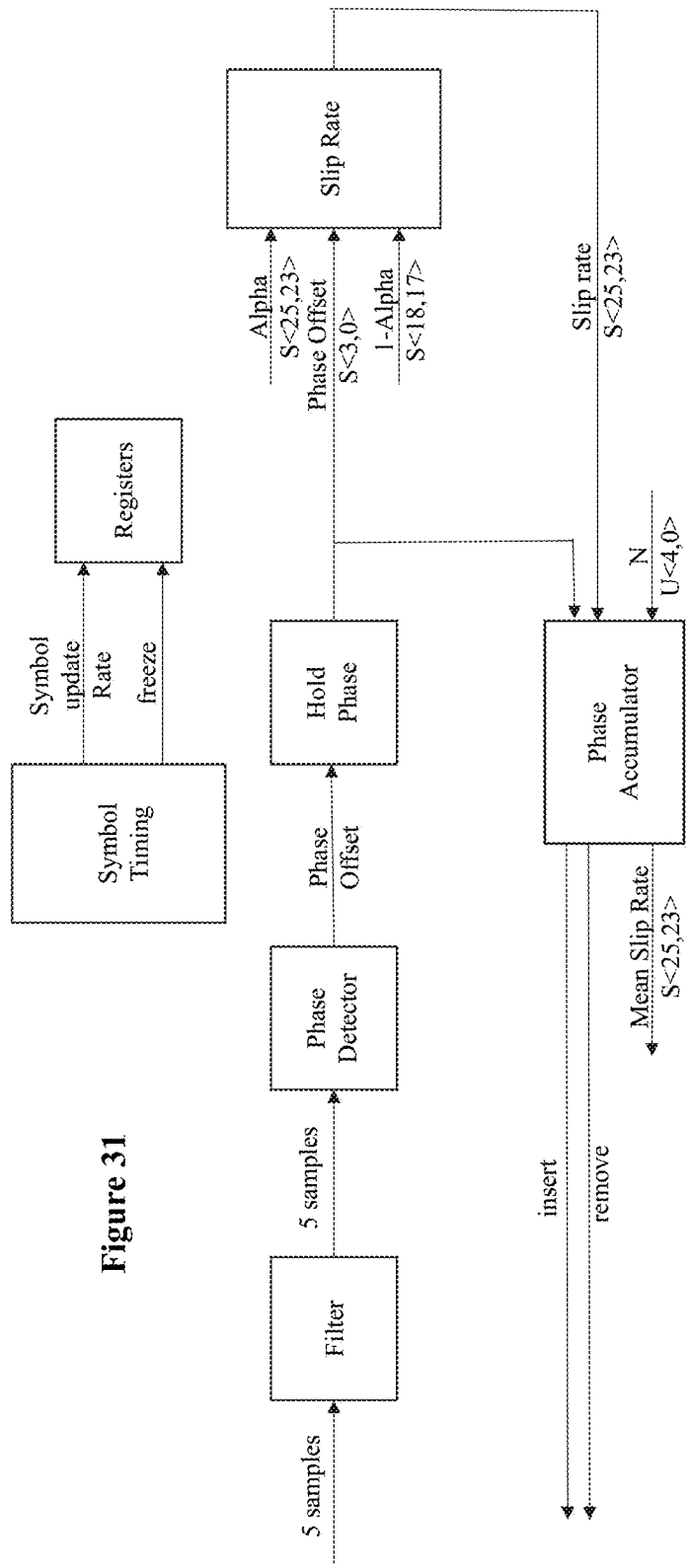
FIG. 31 illustrates an exemplary timing recovery logic block diagram of the link layer logic in accordance with one or more embodiments described herein.

In a particular implementation, the timing recovery block was implemented using fixed point math to best match the capabilities of the FPGA. The FPGA contains DSP blocks with 25 b×18 b multipliers and 48 b adders/accumulators. The slip rate (sample slips per symbol) is maintained with a signed fixed-point word (s<25, 23>—two bits integer and 23 bits fractional). FIG. 31 shows the block diagram of the timing recovery module in this particular implementation.

One skilled in the art recognizes that features will vary in accordance with changes to the implemented FPGA in order to achieve optimal results.

The phase accumulator and slip rate are updated at the symbol rate, which can vary between 9 and 3071 time slot cycles (ppm3_1 to ppm10_2047). The symbol timing block produces the update rate based on the current link configuration.

The filter block takes long pulses and produces one small pulse, with a timeout equal to the configured guard period.

Figure 32:
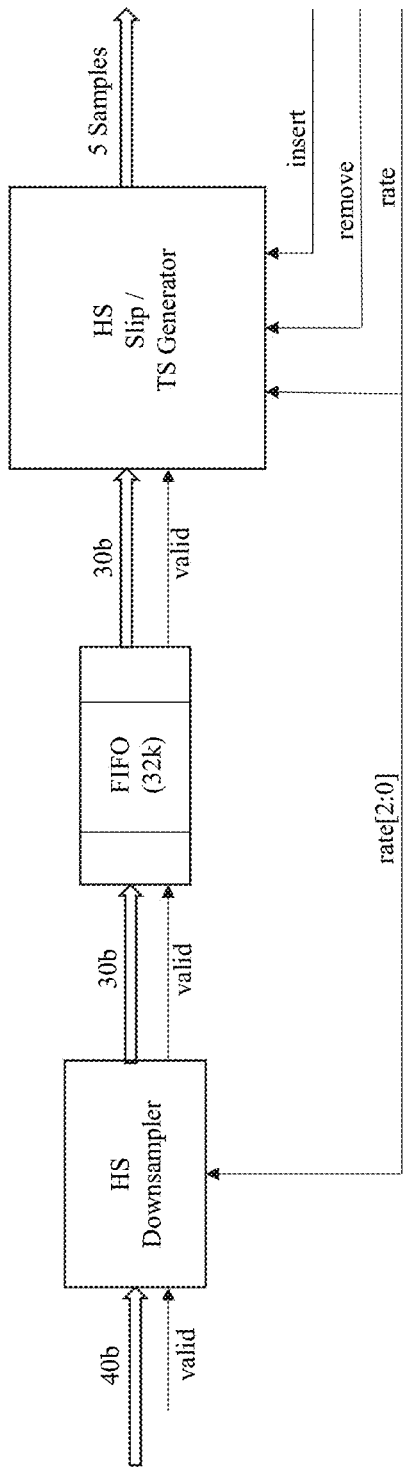
FIG. 32 illustrates an exemplary front end block diagram used for insertion and deletion of time samples in accordance with one or more embodiments described herein.

The timing recovery block slips at a half sample rate, therefore, the receiver front-end must produce half-samples to work with the timing recovery block. FIG. 32 shows a front-end, including a Half-Sample (HS) down sampler. When the local receiver's clock is slower than the remote transmitter's, the slip module will insert half samples when a slip is indicated. When operating at the highest rate (one TS per clock cycle), extra samples accumulate during the entire receive burst. At the end of the burst, these accumulated half samples are finally processed. When operating at all but the highest clock rate, only a small FIFO (one TS) is required, because at least every other clock cycle is available to process accumulated timeslots. Given that the design must operate at all rates; a FIFO is required to store the worst case accumulated half samples. By way of example, current worst case for the embodiments herein leads to a FIFO size of 32K TS (0.5 slips/symbol at the longest burst (ppm10, convolution rate $1/7^{th}$, 255 RS blocks)).

The statistics block (FIG. 30) maintains the following statistics (taken at the end of each burst): Variance squared (saves a HW square root); Mean slip rate (slips per symbol); Symbol count (number of symbols in last burst); Insertion count (number of half samples inserted in last burst); Deletion count (number of half samples deleted in last burst); ALPHA (auto) used in last burst; and 1-ALPHA (auto) used in last burst.

Two features are included to support half-duplex mode timing recovery. These consist of Auto ALPHA/dual ALPHA and Freeze. These are controls that effect how the timing recovery starts up to initiate a link and then how it transitions to forwarding timing recovery configuration from the end of one burst to the beginning of the next burst. To support rapid acquisition and a stable link, a two-phase mode of operation is used in timing recovery. All timing recovery constants (ALPHA, 1-ALPHA, and N) have two versions; the acquisition value and the run value. In Auto mode, the run value for the constants is automatically chosen from the acquisition value. In dual mode, the two versions of each constant are set in registers. It was found in lab testing that the Auto ALPHA mode works well in all tested conditions with ALPHA=7 and N=1. The timing recovery function must Freeze (pause) when not actively receiving a burst. The slip rate that is frozen at the end of a burst is the average slip rate over the last 64 symbols. This slip rate is the starting slip rate for the next receive burst.

By way of example, a 10 ppm offset—which is the drift rate of many commercially available clocks—was able to maintain synchronization with a burst length of more than 80 million timeslots. Without the timing recovery the limit of the burst length would have been 100 thousand timeslots; this is an increased burst length of more than 800 times. In addition, the monitor of the timing recovery provides measures of both the system clock offset and signal jitter.

In a specific embodiment of an APPM system to facilitate communications that cross the AWI, the LED transmitters described above may be replaced with high pulse energy source such as a Q-switched laser.

Referring to FIG. 1a, this specific APPM system may be optimal for the communications between underwater assets 10 and above water assets 30 due to its ability to adapt to instabilities and irregularities in the channel medium (turbidity, sea state, cloud cover, etc.), achieve and maintain nearly errorless bi-directional data transfer at operationally meaningful data rates. In some instances, the underwater (or subsea) assets may be stationary, e.g., sensor system 15 of FIG. 1a, in which case establishing or initiating a communications link would be less difficult than a configuration with 6 degrees of freedom for both transceivers. For the underwater sensor system scenario, the above water asset 30 may steer optics using a gimbal or other mechanism to the fixed location using, e.g., predicted position coordinates. In other cases, the underwater asset may not be fixed, such as with AUVs or submarines 10, and establishing a communications link is more difficult and likely requires enhanced scanning technology.

Closing a bidirectional optical communications link through the AWI requires the link layer to manage certain channel characteristics that are more pronounced than underwater communications. One such characteristic is pulse spreading. An underwater system, depending on source divergence and receiver FOV experiences a small amount of pulse spreading. In an AWI configuration the pulse spreading can be many times greater depending on the presence, density and depth of fog and/or clouds due to scattering events that occur to the beam in these conditions. Multiple forward scatter creates a multipath condition that causes pulse spreading. This is seen as jitter to the link layer. Using methods discussed herein for earlier embodiments, the link layer is able to assess the jitter condition and reconfigure the pulse rate timing and the number of bits encoded per symbol to allow selection of an optimum data rate for a particular jitter condition.

In configurations where communication links span the AWI, the bidirectional optical channel has properties that require asymmetrical links. Wave-related surface conditions and the higher refractive index of the water result in illumination of a significant angular sector above the underwater (UW) receiver. The above water (AW) transceiver needs to be within link range and within the illumination sector. The UW transceiver transmits a relatively divergent beam to create a large enough target spot on the water surface leading to asymmetric TX power requirements. The AW receiver must be focused and tracking on this spot and the UW transmitter output power must be at such level to overcome the initial signal loss due to seawater absorption to be detected. The down-link beam must point at the small area of sea-surface that is in the FOV of the UW receiver.

As discussed in alternative embodiments above, the air water interface (AWI) operation is expected to require a higher energy transmitter. A currently preferred option is a Q-switched laser. This type of transmitter supports peak pulse power levels of thousands of Watts and would allow signal recovery through an additional 30 dB of loss as compared to the LED based system. Most of this loss will be from the light scattering function as it passes through the AWI. These high-energy sources require significant recovery periods for which APPM is optimally suited. Deeper PPM encoding options such as PPM10 encodes 10 bits in each symbol represented by a single pulse. If the transmission of the next pulse needs to wait for the source to recover for a certain period of time, a version of PPM can be selected that will optimize bandwidth for a given recovery period.

In another alternate embodiment, the data rate of the existing APPM system may be improved by replacing the LED with a laser diode. The primary limitation on the data rate of the first embodiment is the LED transmitter. The optical output of the LED has response times of 20 ns. This relatively slow response time is due to the large junction area and resulting capacitance of the high-power LED used in the transmitter. Laser diodes offer a 20 times improvement to the optical modulation rate of the transmitter.

In the first embodiment, a PMT detector was selected for the APPM hardware evaluation because it offered the best possible sensitivity of any of the optical detectors available. The PMT detector requires the APPM physical hardware to be inside a pressurized housing to operate underwater. An alternative embodiment could include a solid-state photo multiplier as a detector that may be able to directly withstand the underwater pressure environment. These parts are also considerably smaller than the tubes used in the exemplified APPM embodiments described herein. Applications that are cost and size sensitive should be able to use an APPM transceiver based on solid state detectors that are encapsulated and able to attached to the outside of underwater devices and allow the application of this technology to lower cost applications.

The first APPM embodiment has a highly divergent transmitter beam and a large field of view receiver. This supports applications that do not have provisions for precisely pointing at both ends of the communication system. This field of view is estimated to be a 60 degree cone. Some applications may need to operate over wider field of regards. Such applications include fly-by or orbiting maneuvers to recover larger data packages. In these applications, communication may need to be maintained over a full 360 degrees of coverage. This coverage can be provided by a six-element array of APPM receivers and transmitters. To support multiple transceivers, a multiplexer is required that correctly detects the elements in the array that are active and automatically switches between the elements as data is being transmitted.

The APPM embodiments described herein extends ranges in all through-water free space optical communications configurations and facilitates closing the communications loop in optical communication configurations that encompass the AWI. One skilled in the art will recognize that the present embodiments are not limited to water-water or air-to-water applications and will be of use and benefit to air-air communications including turbid medium (e.g., smoke, airborne dust, mist, fog, clouds). Various alternative aspects of the embodiments are not explicitly recited or listed herein, but are clearly within the expertise of one skilled in the art. Such foreseeable and known variations are believed to be within the scope of the present embodiments.

The invention claimed is:

1. A communications system for facilitating communications across a wireless optical channel which includes an air-water interface comprising:
   an optical transmission device for transmitting encoded optical signals across the wireless optical channel, wherein the optical transmission device includes means for encoding the optical signals in accordance with at least one of multiple encoding schemes;
   an optical detection device for receiving transmitted optical signals from the optical transmission device across the wireless optical channel, wherein the optical detection device includes means for automatically adjusting gain of the optical detection device responsive to one or more measurements related to the received optical signals;
   wherein at least one of the optical transmission device and the optical detection device is located under water and another of the optical transmission device and the optical detection device is located in air; and
   further wherein the means for encoding the optical signals varies an applicable at least one of multiple encoding schemes during the communication with the optical detection device responsive to the one or more measurements related to the received optical signals.

2. The communications system of claim 1, wherein the one or more measurements include measurement of received optical signal strength and measurement of received optical signal error rate.

3. The communications system of claim 2, wherein the optical detection device includes at least one photomultiplier tube (PMT) and further wherein automatically adjusting the gain includes adjusting the cathode voltage of the photomultiplier tube.

4. The communications system of claim 2 wherein the optical detection device includes at least one solid state detector and further wherein automatically adjusting the gain includes adjusting the voltage across the solid-state detector.

5. The communication system of claim 1, wherein the means for automatically adjusting gain of the optical detection device includes at least one adjustable gain electronic amplifier.

6. The communication system of claim 1, wherein the optical transmission device is above water and the optical detection device is under water.

7. The communication system of claim 6, wherein the means for encoding data varies the at least one of multiple encoding schemes by changing the data rate of the transmitted optical signals.

8. The communication system of claim 6, wherein the means for encoding data varies the at least one of multiple encoding schemes by changing a number of bits per transmitted symbol.

9. The communication system of claim 6, wherein the means for encoding data varies the at least one of multiple encoding schemes by applying forward error correction.

10. The communication system of claim 9, wherein application of forward error correction includes convolution encoding.

11. The communication system of claim 9, wherein application of forward error correction includes transmission of redundant data.

12. The communication system of claim 1, wherein the optical transmission device includes a light-emitting diode (LED).

13. The communication system of claim 1, wherein the optical transmission device includes a laser.

14. A transceiver for facilitating wireless communications across an air-water interface comprising:
    an optical transmission device for transmitting optical signals, wherein the optical transmission device includes means for encoding data within the transmitted optical signals;
    an optical detection device for receiving optical signals, wherein the optical detection device includes means for automatically adjusting gain of the optical detection device responsive to one or more measurements related to the received optical signals;
    wherein at least one of the optical transmission device and the optical detection device is located under water and another of the optical transmission device and the optical detection device is located in air; and
    a digital signal processor (DSP) for controlling the means for encoding data and the means for automatically adjusting gain of the optical detection device.

15. The transceiver of claim 14, wherein the one or more measurements include measurement of received optical signal strength and measurement of received optical signal error rate.

16. The transceiver of claim 15, wherein the optical detection device includes at least one photomultiplier tube (PMT) and further wherein automatically adjusting the gain includes adjusting the cathode voltage of the photomultiplier tube.

17. The transceiver of claim 15, wherein the optical detection device includes at least one solid state detector and further wherein automatically adjusting the gain includes adjusting the voltage across the solid-state detector.

18. The transceiver of claim 14, wherein the means for automatically adjusting gain of the optical detection device includes at least one adjustable gain electronic amplifier.

19. The transceiver of claim 14, wherein the means for encoding data varies the encoding method by changing the data rate of the transmitted optical signals.

20. The transceiver of claim 14, wherein the means for encoding data varies the encoding method by changing a number of bits per transmitted symbol.

21. The transceiver of claim 14, wherein the means for encoding data varies the encoding method by applying forward error correction.

22. The transceiver of claim 21, wherein application of forward error correction includes convolution encoding.

23. The transceiver of claim 21, wherein application of forward error correction includes transmission of redundant data.

24. The transceiver of claim 14, wherein the optical transmission device includes a light-emitting diode (LED).

25. The transceiver of claim 14, wherein the optical transmission device includes a laser.

26. The transceiver of claim 14, wherein the digital signal processor (DSP) is a fully-programmable gate array (FPGA).

27. The transceiver of claim 14, further comprising a pressurized housing containing the optical transmission device and the optical detection device.

28. The transceiver of claim 14, wherein the optical transmission device further includes one or more optical components.

29. A communications system for facilitating communications across a wireless optical channel which includes an air-water interface comprising:
    a first transceiver including a first optical transmission device for transmitting optical signals and a first optical detection device for receiving optical signals;
    a second transceiver including a second optical transmission device for transmitting optical signals and a second optical detection device for receiving optical signals;
    wherein the first transceiver and the second transceiver include means for adapting one or more components thereof during the communications across the optical channel responsive to changes in the received optical signals; and
    further wherein at least one of the first and second transceivers is located underwater and another of the another of the first and second transceivers is located in air.

30. The communication system of claim 29, wherein the first optical detection device and the second optical detection device each include at least one photomultiplier tube (PMT) and means for automatically adjusting gain of the at least one PMT responsive to one or more measurements related to the received optical signals.

31. The communication device of claim 29, wherein the first optical transmission device and the second optical transmission device each include at least one light-emitting diode (LED) and means for encoding data within the transmitted optical signals.

* * * * *